US012349004B2

(12) United States Patent
Mukherjee et al.

(10) Patent No.: US 12,349,004 B2
(45) Date of Patent: *Jul. 1, 2025

(54) APPARATUS AND METHODS FOR USER DEVICE BUFFER MANAGEMENT IN WIRELESS NETWORKS

(71) Applicant: Charter Communications Operating, LLC, St. Louis, MO (US)

(72) Inventors: Amitav Mukherjee, Elk Grove, CA (US); Maulik Vaidya, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,379

(22) Filed: Aug. 5, 2022

(65) Prior Publication Data
US 2022/0400402 A1    Dec. 15, 2022

Related U.S. Application Data

(62) Division of application No. 16/790,527, filed on Feb. 13, 2020, now Pat. No. 11,412,406.

(51) Int. Cl.
*H04W 28/02* (2009.01)
*H04L 1/1812* (2023.01)
(Continued)

(52) U.S. Cl.
CPC ....... *H04W 28/0278* (2013.01); *H04L 1/1812* (2013.01); *H04W 72/12* (2013.01); *H04W 76/15* (2018.02)

(58) Field of Classification Search
CPC . H04W 28/0278; H04W 76/15; H04W 72/12; H04L 1/1812
See application file for complete search history.

(56) References Cited

U.S. PATENT DOCUMENTS 6,671,258 B1 * 12/2003 Bonneau ................ H04L 47/10
370/235
6,859,435 B1    2/2005 Lee et al.
(Continued)

FOREIGN PATENT DOCUMENTS

WO    WO-2018031327 A1    2/2018
WO    WO-2018203720 A1    11/2018
(Continued)

OTHER PUBLICATIONS

Author Unknown, Enhancements for SI Transmission on NR-U, Document No. R2-1816608, 2018, pp. 1-3.
(Continued)

*Primary Examiner* — Christopher M Crutchfield
*Assistant Examiner* — Tito Q Pham
(74) *Attorney, Agent, or Firm* — Patent Beach PC

(57) ABSTRACT

Apparatus and methods for improving throughput and reliability in a wireless network. In one embodiment, the apparatus and methods provide mechanisms for wireless user device buffer management that mitigate buffer overflow within the device due to overscheduling, such as from different networks with which the device is connected simultaneously. In one variant, a 3GPP-based signaling architecture from wireless device to the multiple networks is provided to enable user device-controlled management buffer overflow. In another variant, potentially buffer-demanding (e.g., HARQ) process management and prioritization rules are defined to avoid buffer overflow. In other variant, buffer size computation is provided considering the number of networks to which the wireless user device can connect.

23 Claims, 29 Drawing Sheets

(51) Int. Cl.
*H04W 72/12* (2023.01)
*H04W 76/15* (2018.01)

(56) References Cited

U.S. PATENT DOCUMENTS

| | | |
|---|---|---|
| 9,204,269 B1 | 12/2015 | Cham et al. |
| 11,057,865 B1 | 7/2021 | Wong |
| 11,412,406 B2* | 8/2022 | Mukherjee ............ H04L 1/1812 |
| 11,638,234 B2 | 4/2023 | Wong et al. |
| 2002/0188807 A1* | 12/2002 | Chaudhry ............ G06F 12/0813 711/E12.051 |
| 2005/0228971 A1* | 10/2005 | Samra ................... G06F 9/5016 712/217 |
| 2012/0028592 A1 | 2/2012 | Pick et al. |
| 2012/0033612 A1 | 2/2012 | Jazra |
| 2014/0105028 A1 | 4/2014 | Bhaskaran et al. |
| 2014/0219236 A1* | 8/2014 | Uchino ..................... H04L 1/00 370/329 |
| 2014/0226606 A1 | 8/2014 | Nishigori et al. |
| 2014/0281390 A1 | 9/2014 | Boland et al. |
| 2014/0286170 A1 | 9/2014 | Ericson et al. |
| 2014/0293860 A1 | 10/2014 | Hegde |
| 2014/0301193 A1 | 10/2014 | Liu et al. |
| 2015/0110018 A1* | 4/2015 | Rosa ...................... H04W 72/29 370/329 |
| 2015/0181590 A1* | 6/2015 | Park ...................... H04L 5/0055 370/280 |
| 2015/0195754 A1 | 7/2015 | Zhang et al. |
| 2015/0208366 A1* | 7/2015 | Papasakellariou .. H04W 52/146 370/311 |
| 2015/0282138 A1* | 10/2015 | Choi ...................... H04L 1/1874 370/329 |
| 2015/0359036 A1 | 12/2015 | Seo et al. |
| 2016/0014632 A1 | 1/2016 | Siow et al. |
| 2016/0219607 A1 | 7/2016 | You et al. |
| 2016/0227540 A1* | 8/2016 | Chen ...................... H04L 5/0064 |
| 2016/0241362 A1 | 8/2016 | El-Khamy et al. |
| 2017/0118108 A1* | 4/2017 | Avci ........................ H04L 45/36 |
| 2017/0164234 A1 | 6/2017 | Kalapatapu et al. |
| 2017/0244651 A1 | 8/2017 | Saxton |
| 2017/0311247 A1 | 10/2017 | Qi et al. |
| 2017/0353586 A1* | 12/2017 | Leucht-Roth .......... H04L 69/22 |
| 2017/0359759 A1 | 12/2017 | Brown et al. |
| 2018/0254860 A1* | 9/2018 | Wong ...................... H04L 1/1825 |
| 2018/0288657 A1 | 10/2018 | Stojanovski et al. |
| 2018/0368199 A1* | 12/2018 | Zeng ...................... H04W 72/21 |
| 2019/0045487 A1 | 2/2019 | You et al. |
| 2019/0052582 A1* | 2/2019 | Gaal ....................... H04L 1/1887 |
| 2019/0124633 A1 | 4/2019 | Hang et al. |
| 2019/0215729 A1* | 7/2019 | Oyman ............... H04L 65/1016 |
| 2019/0327031 A1* | 10/2019 | Fan ...................... H04L 1/1812 |
| 2019/0356743 A1 | 11/2019 | Park et al. |
| 2019/0357117 A1 | 11/2019 | Cudak et al. |
| 2020/0008224 A1 | 1/2020 | Ozturk et al. |
| 2020/0022067 A1 | 1/2020 | Pan et al. |
| 2020/0053622 A1 | 2/2020 | Huang-Fu et al. |
| 2020/0068481 A1 | 2/2020 | Kim et al. |
| 2020/0107213 A1 | 4/2020 | Park et al. |
| 2020/0196199 A1 | 6/2020 | Sharma et al. |
| 2020/0221464 A1 | 7/2020 | Nielsen et al. |
| 2020/0236728 A1* | 7/2020 | Yi ........................ H04L 5/0082 |
| 2020/0260330 A1 | 8/2020 | Zhu et al. |
| 2020/0314851 A1 | 10/2020 | Vaidya et al. |
| 2020/0342311 A1 | 10/2020 | Peroulas et al. |
| 2021/0014791 A1 | 1/2021 | Freda et al. |
| 2021/0029205 A1 | 1/2021 | Dandra et al. |
| 2021/0029608 A1 | 1/2021 | Dodd-Noble et al. |
| 2021/0105866 A1 | 4/2021 | Kavuri et al. |
| 2021/0235465 A1* | 7/2021 | Meylan ................. H04W 72/21 |
| 2021/0314858 A1 | 10/2021 | Wong et al. |
| 2021/0345161 A1 | 11/2021 | Zhu et al. |
| 2021/0392615 A1 | 12/2021 | Wong et al. |

FOREIGN PATENT DOCUMENTS

| | | |
|---|---|---|
| WO | WO-2018228562 A1 | 12/2018 |
| WO | WO-2020037666 A1 | 2/2020 |
| WO | WO-2020103654 A1 | 5/2020 |
| WO | WO-2020198494 A3 | 11/2020 |
| WO | WO-2021163601 A1 | 8/2021 |

OTHER PUBLICATIONS

Author Unknown, Enhancements for SI Transmission on NR-U, Document No. R2-1816835, 2018, pp. 1-3.
Author Unknown, Extended, Overlapping SI-windows in NR-U, Document No. R2-1815048, 2018, pp. 1-4.
Author Unknown, System Information Enhancements for NR-U, Document No. R2-1816267, 2018, pp. 1-4.
Author Unknown, SI Design in NR-U, Document No. R2-1817325, 2018, pp. 1-2.
Author Unknown, SI Update in NR-U, Document No. R2-1816314, 2018, pp. 1-2.
"Internet Protocol, DARPA Internet Program, Protocol Specification", IETF RCF 791, Sep. 1981, 50 pages.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Author Unknown, Mapping Between SI Messages and SI Windows in NR-U, pp. 1-3, Doc. No. R2-1816317, Nov. 16, 2018.
Author Unknown, SI scheduling in NR-u, Doc. No. R2-1816700, pp. 1-2, Nov. 16, 2018.

* cited by examiner

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers, 64QAM) 75376 (2 layers, 64QAM) | 3654144 | 2 or 4 |
| Category 7 | 301504 | 149776 (4 layers, 64QAM) 75376 (2 layers, 64QAM) | 3654144 | 2 or 4 |
| Category 8 | 2998560 | 299856 | 35982720 | 8 |
| Category 9 | 452256 | 149776 (4 layers, 64QAM) 75376 (2 layers, 64QAM) | 5481216 | 2 or 4 |
| Category 10 | 452256 | 149776 (4 layers, 64QAM) 75376 (2 layers, 64QAM) | 5481216 | 2 or 4 |
| Category 11 | 603008 | 149776 (4 layers, 64QAM) 195816 (4 layers, 256QAM) 75376 (2 layers, 64QAM) 97896 (2 layers, 256QAM) | 7308288 | 2 or 4 |
| Category 12 | 603008 | 149776 (4 layers, 64QAM) 195816 (4 layers, 256QAM) 75376 (2 layers, 64QAM) 97896 (2 layers, 256QAM) | 7308288 | 2 or 4 |

NOTE 1: In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

FIG. 1 (Prior Art)

| UE Category | Total layer 2 buffer size [bytes] | With support for split bearers |
|---|---|---|
| Category 1 | 150 000 | 230 000 |
| Category 2 | 700 000 | 1 100 000 |
| Category 3 | 1 400 000 | 2 300 000 |
| Category 4 | 1 900 000 | 3 100 000 |
| Category 5 | 3 500 000 | 5 900 000 |
| Category 6 | 3 300 000 | 5 800 000 |
| Category 7 | 3 800 000 | 6 200 000 |
| Category 8 | 42 200 000 | 61 600 000 |
| Category 9 | 4 800 000 | 7 200 000 |
| Category 10 | 5 200 000 | 7 600 000 |
| Category 11 | 6 200 000 | 11 000 000 |
| Category 12 | 6 700 000 | 11 500 000 |

FIG. 2 (Prior Art)

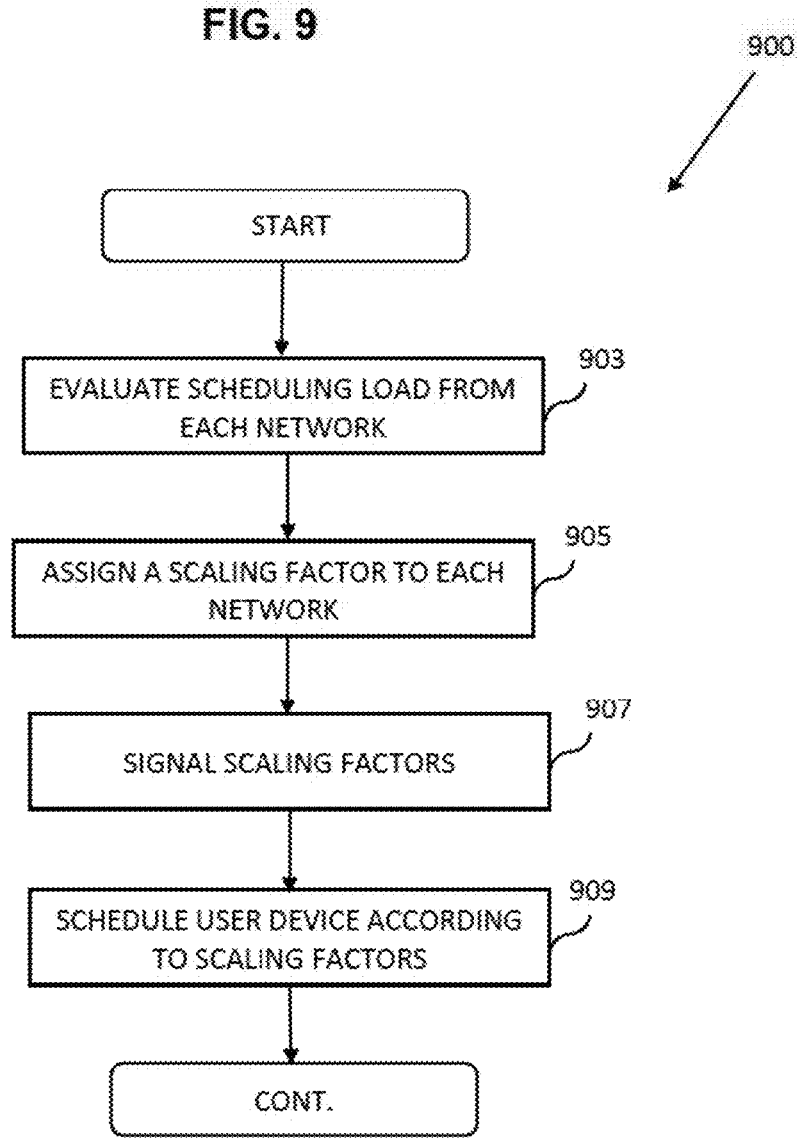

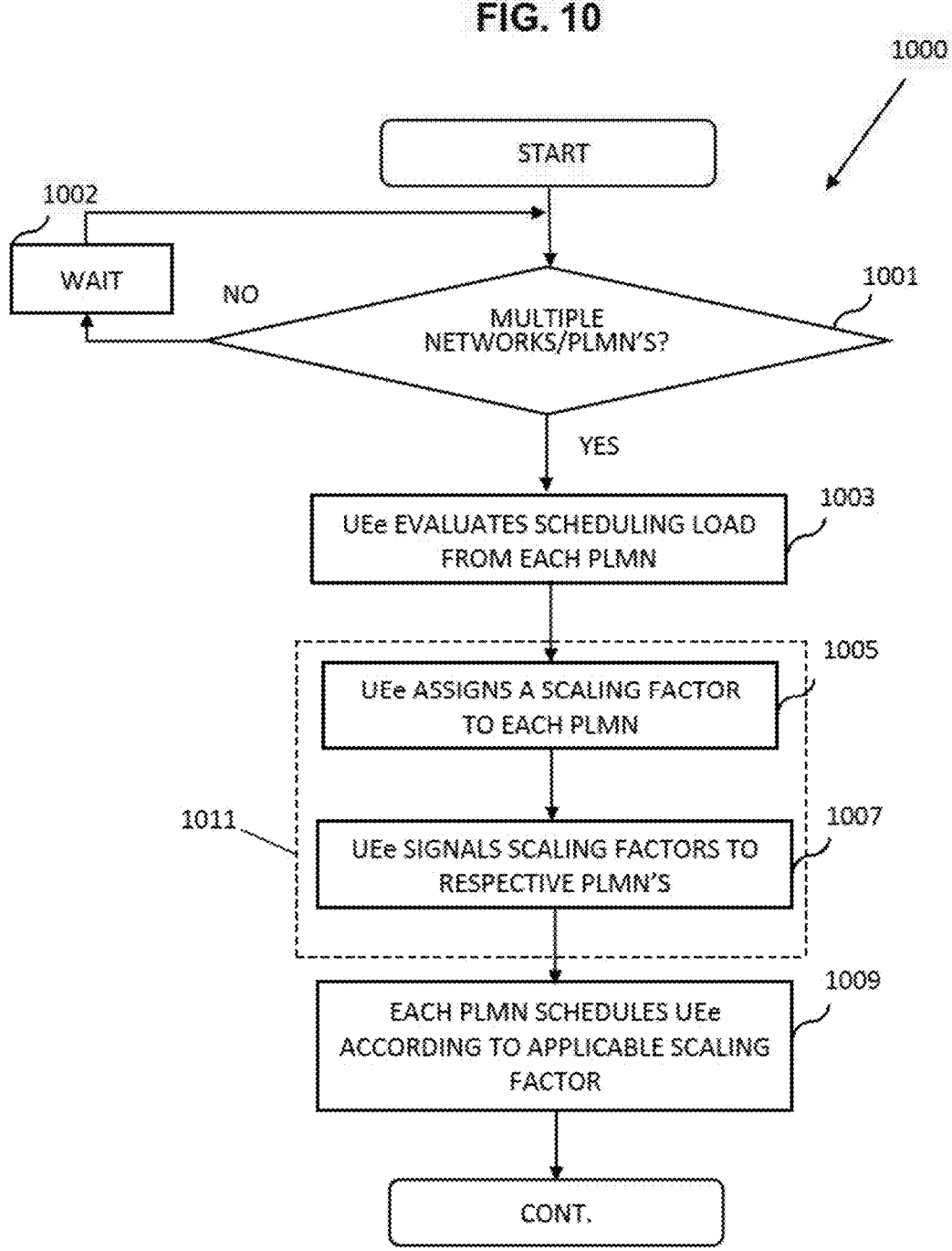

| Definitions for parameters |
|---|
| *lch-ToSCellRestriction*<br>Indicates whether the UE supports restricting data transmission from a given LCH to a configured (sub-) set of serving cells (see allowedServingCells in LogicalChannelConfig). A UE supporting pdcp-DuplicationMCG-OrSCG-DRB or pdcp-DuplicationSRB (see PDCP-Config) shall also support lch-ToSCellRestriction. |
| *lcp-Restriction*<br>Indicates whether UE supports the selection of logical channels for each UL grant based on RRC configured restriction. |
| *logicalChannelSR-DelayTimer*<br>Indicates whether the UE supports the logicalChannelSR-DelayTimer as specified in TS 38.321 [8]. |
| *longDRX-Cycle*<br>Indicates whether UE supports long DRX cycle as specified in TS 38.321 [8]. |
| *multipleConfiguredGrants*<br>Indicates whether UE supports more than one configured grant configurations (including both Type 1 and Type 2) in a cell group. For each cell, the UE supports at most one configured grant per BWP and the maximum number of configured grant configurations per cell group is 2. If absent, for each configured cell group, the UE only supports one configured grant configuration on one serving cell. |
| *multipleSR-Configurations*<br>Indicates whether the UE supports 8 SR configurations per PUCCH cell group as specified in TS 38.321 [8]. |
| *recommendedBitRate*<br>Indicates whether the UE supports the bit rate recommendation message from the gNB to the UE as specified in TS 38.321 [8]. |
| *recommendedBitRateQuery*<br>Indicates whether the UE supports the bit rate recommendation query message from the UE to the gNB as specified in TS 38.321 [8]. This field is only applicable if the UE supports recommendedBitRate. |
| *shortDRX-Cycle*<br>Indicates whether UE supports short DRX cycle as specified in TS 38.321 [8]. |
| *skipUplinkTxDynamic*<br>Indicates whether the UE supports skipping of UL transmission for an uplink grant indicated on PDCCH if no data is available for transmission as specified in TS 38.321 [8]. |

FIG. 13A (Prior Art)

| Definitions for parameters |
|---|
| *appliedFreqBandListFilter* <br> Mirrors the *FreqBandList* that the NW provided in the capability enquiry, if any. The UE filtered the band combinations in the *supportedBandCombinationList* in accordance with this *appliedFreqBandListFilter*. |
| *appliedFilters* <br> Contains all filters requested with UE-CapabilityRequestFilterNR from version 15.6.0 onwards. |
| *downlinkSetEUTRA* <br> Indicates the features that the UE supports on the DL carriers corresponding to one EUTRA band entry in a band combination by FeatureSetEUTRA-DownlinkId. The FeatureSetEUTRA-DownlinkId = 0 means that the UE does not support a EUTRA DL carrier in this band of a band combination. |
| *downlinkSetNR* <br> Indicates the features that the UE supports on the DL carriers corresponding to one NR band entry in a band combination by FeatureSetDownlinkId. The FeatureSetDownlinkId = 0 means that the UE does not support a DL carrier in this band of a band combination. A fallback per band feature set resulting from the reported DL feature set that has fallback per CC feature set is not signalled but the UE shall support it. |
| *featureSetCombinations* <br> Pools of feature sets that the UE supports on the NR or MR-DC band combinations. |
| *featureSets* <br> Pools of downlink and uplink features sets as well as a pool of FeatureSetCombination elements. A FeatureSetCombination refers to the IDs of the feature set(s) that the UE supports in that FeatureSetCombination. The BandCombination entries in the BandCombinationList then indicate the ID of the FeatureSetCombination that the UE supports for that band combination. |
| *naics-Capability-List* <br> Indicates that UE in MR-DC supports NAICS as defined in defined in TS 36.331 [17]. |
| *supportedBandCombinationList* <br> Defines the supported NR and/or MR-DC band combinations by the UE. For each band combination the UE identifies the associated feature set combination by featureSetCombinations index referring to featureSetCombination. A fallback band combination resulting from the reported CA and MR-DC band combination is not signalled but the UE shall support it. For intra-band non-contiguous CA band combinations, the UE only includes one band combination, and exclude the others for which the presence of uplink CA bandwidth class in the band combination entry is different. One band combination entry can also indicate support of any other possible permutations in the presence of uplink CA bandwidth class where a paired downlink CA bandwidth class is the same or where the number of UL CCs is smaller than the one of paired DL CCs expressed by the CA bandwidth class, as specified in TS 36.306 [15]. For these band combinations not included in the capability, the supported feature set is the same as the ones for the band combination included in the UE capability. |
| *supportedBandListNR* <br> Includes the supported NR bands as defined in TS 38.101-1 [2] and TS 38.101-2 [3]. For a band supported by the UE, it is mandatory for the UE to support the number of PRBs of CORESET#0 as defined in TS 38.213 [11] for both the initial downlink BWP and the initial uplink BWP. |

| | | | | |
|---|---|---|---|---|
| *uplinkSetEUTRA* <br> Indicates the features that the UE supports on the UL carriers corresponding to one EUTRA band entry in a band combination by FeatureSetEUTRA-UplinkId. The FeatureSetUplinkId = 0 means that the UE does not support a UL carrier in this band of a band combination. | Band | N/A | No | No |
| *uplinkSetNR* <br> Indicates the features that the UE supports on the UL carriers corresponding to one NR band entry in a band combination by FeatureSetUplinkId. The FeatureSetUplinkId = 0 means that the UE does not support a UL carrier in this band of a band combination. A fallback per band feature set resulting from the reported UL feature set that has fallback per CC feature set is not signalled but the UE shall support it. | Band | N/A | No | No |

FIG. 13B (Prior Art)

| | | | | |
|---|---|---|---|---|
| *uplinkSetEUTRA*<br>Indicates the features that the UE supports on the UL carriers corresponding to one EUTRA band entry in a band combination by FeatureSetEUTRA-UplinkId. The FeatureSetUplinkId = 0 means that the UE does not support a UL carrier in this band of a band combination. | Band | N/A | No | No |
| *uplinkSetNR*<br>Indicates the features that the UE supports on the UL carriers corresponding to one NR band entry in a band combination by FeatureSetUplinkId. The FeatureSetUplinkId = 0 means that the UE does not support a UL carrier in this band of a band combination. A fallback per band feature set resulting from the reported UL feature set that has fallback per CC feature set is not signalled but the UE shall support UL. | Band | N/A | No | No |
| *maxHARQprocess-DL*<br>Indicates maximum number of HARQ process in DL | Band | N/A | No | No |
| *maxHARQprocess-UL*<br>Indicates maximum number of HARQ process in UL | Band | N/A | No | No |

| UCI Parameters | Description |
|---|---|
| HARQ ACK/NCK | ACK/NCK- Confirms if a packet correctly decoded |
| SR | Scheduling Request- Requests scheduling from gNB/eNB |
| CSI | Channel State Information- Indicates how good or bad a channel is at a specific time |
| DR | Delay Request- Requests network to delay further scheduling HARQ — 1821 |

APPARATUS AND METHODS FOR USER DEVICE BUFFER MANAGEMENT IN WIRELESS NETWORKS

PRIORITY

This application is a divisional of, and claims priority to, co-owned and co-pending U.S. patent application Ser. No. 16/790,527 of the same title filed on Feb. 13, 2020, and issuing as U.S. Pat. No. 11,412,406, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to mitigating buffer overflow and packet loss in a wireless device connected to two or more networks (e.g., 3GPP PLMNs or Public Land Mobile Networks) utilizing licensed, quasi-licensed, and/or unlicensed spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth |

TABLE 2-continued

| Frequency range | Type | Center frequency | Availability | Licensed users |
|---|---|---|---|---|
| 61 GHz-61.5 GHz | A | 61.25 GHz | Subject to local acceptance | exploration-satellite service (active) Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

5G New Radio (NR) and NG-RAN (Next Generation Radio Area Network)

NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

5G NR key aspects were originally specified in 3GPP Release 15 NG-RAN (and further refined in follow-on Release 16). For instance, low latency communication, beam-based channels, massive Multiple Input Output (MIMO) with large numbers of controllable antenna elements, scalable-width subchannels, carrier aggregation, cloud Radio-Access Network (RAN) capability, network slicing, and coexistence with LTE were first specified in Release 15.

In some aspects, Release 17 NG-RAN leverages technology and functions of extant LTE/LTE-A (colloquially referred to as 4G or 4.5G), as bases for further functional development and capabilities. For instance, Release 17 is bringing foundational enhancements to improve overall network capacity, coverage, latency, device power, and mobility. In Release 17, there will be a focus on massive MIMO (mMIMO), beam management, for mmWave, multi-transmission-point operations, higher mobility. In addition, Release 17 will provide support for Multi-Universal Subscriber Identity (UE) MUSIM UEs.

In 3GPP systems, UE Category data (see FIGS. 1 and 2) 101 is provided by the UE to the network, and is used to allow a 4G eNB or 5G gNB to communicate more effectively with all the UEs to which it is connected. The UE category 101 defines downlink (DL) throughput performance as well as uplink (UL) throughput performance. The relationship between LTE UE category and maximum number of soft channel bits supported 103 is shown in FIG. 1 for the DL. UE Category 8 supports the largest peak throughput and in turn, the largest total of soft channel bits as specified in 3GPP TS36.306 ("3rd Generation Partnership Project; Technical Specification Group Radio Access Network; Evolved Universal Terrestrial Radio Access Network (E-UTRAN); User Equipment (UE) Radio Access Capability (Release 15)" dated September 2019, which is incorporated herein by reference in its entirety). From Release 12 onwards, separate UL and DL UE Categories are defined.

The UE Category 101 is signaled to the network by the UE during initial access as part of UE-EUTRA-Capability Information Element (IE), as described in 3GPP TS 36.331, entitled "3rd Generation Partnership Project; Technical Specification Group Radio Access Network; Evolved Universal Terrestrial Radio Access Network (E-UTRAN); Radio Resource Control (Release 15)" dated September 2019, which is incorporated herein by reference in its entirety.

The higher the UE throughput, the larger soft buffer size is required to store the received data. Moreover, the UE Layer 1 (L1) peak throughput depends on the aggregate soft buffer size or total number of supported soft channel bits.

The larger the Layer 1 soft buffer size, the more data the UE can receive and process in a predefined period (support for higher-order modulation, more HARQ processes, more spatial layers, and/or carriers is implicit). Less-capable UEs, such as Machine Type Communication (MTC), IoT, and NR-Light devices will have smaller aggregate soft buffer sizes, such as to support lower cost and hardware complexity.

Furthermore, both LTE and 5G NR, DL and UL HARQ processes are associated with an L1 soft buffer, wherein the constituent soft channel bits are manipulated based on whether a new transmission or a retransmission is performed. For instance, soft bits are combined across retransmissions.

Notably, 3GPP Release 15 defines greater layer buffer sizes than the previous Releases. For instance, the total Layer 2 (L2) buffer size for non-dual connectivity (non-DC), multi-RAT dual connectivity (MR-DC), and NR dual connectivity (NR-DC) scenarios is defined as the sum of the number of bytes that the UE is capable of storing in the RLC transmission windows and RLC reception and reordering windows, and also in PDCP reordering windows for all radio bearers, per 3GPP TS 36.306 (EUTRA) and TS 38.306 (NR). The relation between LTE UE category and L2 total buffer size is shown in FIG. 2.

As specified in 3GPP TS 38.306, the total L2 buffer size in MR-DC and NR-DC, is the maximum calculated values of the following Equations (1) and (2):

$$\text{MaxULDataRate}\_MN*\text{RLCRTT}\_MN+ \\ \text{MaxULDataRate}\_SN*\text{RLCRTT}\_SN+ \\ \text{MaxDLDataRate}\_SN*\text{RLCRTT}\_SN+\text{MaxDLDataRate}\_MN*(\text{RLCRTT}\_SN+X2/Xn\ \text{delay}+ \\ \text{Queuing in } SN) \quad \text{Eqn. (1)}$$

$$\text{MaxULDataRate}\_MN*\text{RLCRTT}\_MN+ \\ \text{MaxULDataRate}\_SN*\text{RLCRTT}\_SN+ \\ \text{MaxDLDataRate}\_MN*\text{RLCRTT}\_MN+\text{MaxDLDataRate}\_SN*(\text{RLCRTT}\_MN+X2/Xn\ \text{delay}+ \\ \text{Queuing in } MN) \quad \text{Eqn. (2)}$$

Otherwise it is calculated by Eqn. (3):

$$\text{MaxDLDataRate}*RLC\ RTT+\text{MaxULDataRate}*RLC\ RTT \quad \text{Eqn. (3)}$$

wherein:
X2/Xn delay+Queuing in SN (secondary node)=25 ms if SCG is NR, and 55 ms if SCG is EUTRA;
X2/Xn delay+Queuing in MN (master node)=25 ms if MCG is NR, and 55 ms if MCG is EUTRA;
RLC RTT for EUTRA cell group=75 ms; and
RLC RTT for NR cell group ranges between 20 ms and 50 ms.

RLC RTT for NR cell group is defined in Table 4.1.4-1 of TS 38/306 as follows:

TABLE 4

| SCS (KHz) | RLC RTT (ms) |
|---|---|
| 15 | 50 |
| 30 | 40 |
| 60 | 30 |
| 120 | 20 |

Per TS 38.306, the required total Layer 2 buffer size is determined as the maximum total Layer 2 buffer size of all the calculated ones for each band combination and the applicable Feature Set combination in the supported MR-DC or NR band combinations. The RLC RTT for NR cell group corresponds to the smallest SCS numerology supported in the band combination and the applicable Feature Set combination.

While the above equations allow the network to estimate the required total L2 buffer size of the NR UE, the actual L2 buffer size is not explicitly signaled by the NR UE to the network. Hence, the network is capable of at best an "educated guess" in this regard.

It is noted that in order to avoid overscheduling, a Release-15 NR UE can request the network to reduce the number of configured spatial MIMO layers or component carriers; however, this feature was defined without considering either L1 or L2 buffers sizes, and hence may not adequately address various types of scenarios relating to buffer overflow.

Referring to FIGS. 3 and 4, Multi-Universal Subscriber Identity Module (MUSIM) NR UE architectures 300 are under discussion for standardization in 3GPP Release 17, wherein each USIM 303a, 303b of the UE 301 is associated with a respective Public Land Mobile Networks (PLMNs) 311a, 311b, including one or more gNBs 312a, 312b. The Release 17 MUSIM scope considers mainly common solutions for both inter-MNO and intra-MNO cases. Additionally, Release 17 also supports Multiple RAT concurrency scenarios, such as LTE-only+NR Stand Alone (SA), or NR SA+NR SA. The UE types supported by Release 17 include (i) single Tx/Rx UEs that can only communicate with one network at a time, (ii) dual Rx single Tx UEs that can simultaneously receive from two different networks, and (iii) dual Tx/Rx UEs that can both receive and transmit simultaneously with two networks.

Unaddressed Issues of Buffer Management and Overflow—

As described above, L1 and L2 buffer overflow occurs when more data is put into L1 and L2 buffer than their capacity ("overscheduling"). This buffer overflow may be seen in, e.g., MUSIM scenarios when the UE must receive data from multiple uncoordinated networks. Specifically, without coordination between the different networks (e.g., PLMNs 311a, 311b of FIGS. 3 and 4 discussed above) for which a MUSIM UE 301 has been provisioned, the combined instantaneous downlink data from both networks may exceed the L1 soft buffer and/or L2 buffer capacity of the UE. Also, from the network perspective, Release 16 gNBs may not be able to guarantee the UE that an L2 buffer overflow will not occur. If such overflow occurs, the UE may discard packets in the L2 buffer, thereby resulting in packet loss.

Moreover, the buffer overflow may be more severe in Release 17 Dual Connectivity (DC) than Release 15/16 Dual Connectivity (DC) scenarios. Specifically, Release 17 UEs are expected to support very high throughput, and a Release 17 UE can connect to multiple PLMNs, which may belong to different MNOs and hence not able to coordinate with each other. As such, each network is unaware of the total scheduling load of a given UE. Thus, since Release 17 does not provide any signaling from the UE to the network to indicate its scheduling or buffer capacity, the Release 17 MUSIM UE may be overscheduled with more data load than its L1 and L2 buffers are capable of handling, and hence buffer overflow. In contrast, in Release 15/16 DC, the master node (MN) knows whether a UE is configured with a secondary cell group (SCG), and can mitigate overflows by estimating the required total buffer at the UE, and accordingly reduce the UE scheduling load.

Furthermore, in either Release 16 or 17, there is currently no provision for signaling of NR UE L1 or L2 buffers sizes/capabilities to the network. The computation of total buffer size in 3GPP TS 38.306 assumes that the UE can receive and transmit at the maximum data rates of the Master Node (MN) and any Secondary Nodes (SNs), which may not be compatible with e.g., certain types Release-17 UEs, such as "NR-Light" UEs that have lower peak throughput and hardware complexity (including reduced aggregate and individual buffer sizes) as compared to NR eMBB or other more fully-featured UEs. As such, the foregoing assumption may lead to greatly over-ranging the less capable UE's buffers. FIG. 4 shows that UE has an active RRC connection with data transfers on PLMN A while it is in IDLE mode on PLMN B (only monitoring paging).

Accordingly, improved apparatus and methods are needed to, inter alia, to mitigate buffer overflow and packet loss within wireless networks, such as e.g., those occurring for MUSIM devices such as 3GPP UEs under certain scenarios, or in other scenarios or contexts.

SUMMARY

The present disclosure addresses the foregoing needs by providing, inter alia, apparatus and methods for a device buffer management in one or more wireless networks.

In one aspect, a computerized mobile device configured for use within multiple mobile network environments is disclosed. In one embodiment, the computerized mobile device includes: digital processor apparatus; first wireless interface apparatus in data communication with the digital processor apparatus and configured for wireless communication with a first radio area network (RAN); second wireless interface apparatus in data communication with the digital processor apparatus and configured for wireless communication with a second RAN; and storage apparatus in data communication with the digital processor apparatus and comprising a storage medium, the storage medium comprising at least one computer program.

In one variant, the at least one computer program is configured to, when executed on the digital processor apparatus: establish data communication with a first network management entity associated with the first RAN, the first network management entity associated with a first network operator and a first mobile network; and establish data communication with a second network management entity associated with the second RAN, the second network management entity associated with a second network operator and a second mobile network. The wireless device can transmit data relating to buffer management to one or both of the management entities.

In one implementation, the first mobile network uses a first wireless access technology such as a 3GPP Long Term Evolution (LTE)-based technology, and the second mobile network uses a second wireless access technology such as a 3GPP New Radio (5G-NR)-based technology. In another implementation, the first and second mobile networks each uses a 3GPP New Radio (5G-NR)-based technology.

In another variant, the at least one computer program is configured to, when executed by the digital processor apparatus, perform the establishment of the data communication with the first network management entity associated with the first RAN and the establishment of the data communication with the second network management entity associated with the second RAN contemporaneously such that at least a portion of the data communication between the computerized mobile device and the first network management entity temporally overlaps with at least a portion of the data communication between the computerized mobile device and the second network management entity.

In one implementation, the contemporaneous establishment of the data communication with the first network management entity associated with the first RAN and the data communication with the second network management entity associated with the second RAN includes maintaining at least (i) a first RRC (Radio Resource Control) connection for the data communication with the first network management entity and (ii) a second, separate RRC (Radio Resource Control) connection for the data communication with the second network management entity.

In another variant, the computerized mobile device further includes L1 buffer management logic in data communication with the data processor apparatus, the L1 buffer management logic configured to enable decoding of the received data from the one or more network without buffer overflow or packet loss. The mobile device may further include L2 buffer logic configured to store data received from the network node, parse the data to L1 frames, and transfer the parsed data to the L1 buffer. In one implementation, L1 logic includes logic for negotiating/signaling for HARQ processing.

In one variant, the L2 buffer logic is configured to perform an L2 total buffer size computation.

In another variant, the L1 buffer in the computerized mobile device comprises multiple virtual buffers, each buffer associated to one of the one or more networks, and is configured to receive data from the associated one or more networks.

In yet another variant, the L1 buffer logic includes Delay Request (DR) logic, the DR logic configured to enable the computerized mobile device to request an associated network to delay transmission of HARQ process data to the computerized mobile device.

In a further variant, the computerized mobile device is an enhanced multi-SIM UE (UEe) that can connect to two or more networks.

In yet another variant, the L2 buffer logic includes scaling weight computation logic. The scaling weights are correlated to an L2 buffer size that the computerized mobile device intends to allocate to be scheduled by each network. In one implementation, the scaling weight computation logic evaluates the expected scheduling capacity for each PLMN that the UEe intends to connect with; computes scaling factors for the each network based on the evaluation; and allocates an L2 buffer portion to each network proportional to the determined scaling weights.

In another aspect of the disclosure, a method of allocating L1 buffer capacity to a plurality of networks to which a UE will connect in order to avoid overflow is described. In one embodiment, the method includes: determining a scheduling capacity associated with each of the plurality of the networks; computing scaling weights indicating an L1 buffer portion (relative to the maximum L1 buffer size) that the UE prospectively will allocate to each of the plurality of the networks, based at least on the determined scheduling capacity; and dividing the L1 buffer into separate virtual buffers, each associated with one of the plurality of networks, with the size of each virtual buffer being proportionate to its computed scaling weight.

In one variant, the method includes initially assigning equal scaling weights to the plurality of the networks; monitoring the scheduling capacity by each of the plurality of networks and buffer overflow; and optimizing the scaling weights iteratively to achieve a desired objective (e.g., no lost packets or overflow, enhanced data throughput and efficiency, etc.).

In another aspect, a method of mitigating L1 buffer overflow for a wireless device connected to multiple networks is disclosed. In one embodiment, the method includes dividing the multiple networks into two or more categories (e.g., higher priority networks and lower priority networks); configuring a wireless device connected to the lower priority networks to delay HARQ processing; allocating the L1 buffer to HARQ processing for one or more higher priority networks; performing the higher priority HARQ processing via the L1 buffer; and performing the HARQ processing for the lower priority networks after the delay has passed.

In another aspect of the disclosure, a method of estimating L2 buffer size is described. In an exemplary non-Dual Connectivity (NDC) scenario, the methods includes computing a first value, and multiplying the first value by a number relating to the user device (e.g., UEe) Subscriber Identification Card (SIM) configuration in order to compute L2 buffer size.

In an exemplary DC scenario, the method includes computing a second value; multiplying the second value by the number relating to the UEe's SIM configuration; updating the second value by the product of the second value and the number of UEe's SIM; computing a third value; multiplying the third value by the number of UEe's SIM; updating the third value by the product of the third value and the number of UEe's SIM; and computing the L2 buffer size as the maximum of the of the second and the third values.

In another aspect of the disclosure, an enhanced UE (user equipment) apparatus, or UEe, for use within a wireless network is disclosed. In one embodiment, the UEe includes both 4G/4.5G E-UTRAN-based and 5G NR-based wireless interfaces and associated protocol stacks so as to support at least both of: (i) DSDS (Dual SIM Dual Standby) operation, and (ii) multi-network (e.g., multi-PLMN) operation.

In another aspect of the disclosure, a wireless access node is disclosed. In one embodiment, the node is configured as an enhanced 3GPP-compliant eNB/gNB (e.g., 4.5G and/or 5G) and includes: a processor apparatus; a wireless modem chipset in data communication with processor apparatus; a program memory in data communication with processor apparatus; one or more RF front end modules; and a network interface module configured for data communication with a core network (e.g., 5GC). In one implementation, the program memory includes at least one computer program which is configured to, when executed to the processor apparatus, causes transmission of a communication signals in support of one or more HARQ process requested to be delayed by a UE.

In another embodiment, the enhanced node is configured as a 5G NR gNB (gNBe) having at least one CU and a plurality of enhanced DU (DUe) in data communication therewith. In one variant, the HARQ logic is disposed within one or more of the DUe. In another variant, the logic is divided between one or more of the DUe and an enhanced CU (CUe) for that gNBe.

In yet another variant, the DUe are sufficiently separate in geographic or topological terms such as to be able to act as separate access nodes (or even cells) for purposes of multi-node/cell UEe connection procedures (i.e., the procedures are implemented intra-gNBe).

In another aspect of disclosure, a computer readable apparatus is disclosed. In one embodiment, the apparatus includes a storage medium configured to store one or more computer program. In embodiment, the apparatus includes a program memory, flash memory, or HDD or SSD on a computerized controller device, such as MSO or MNO network controller. In another embodiment, the apparatus includes a program memory, flash memory, or HDD or SDD on a computerized access node (e.g. gNBe) or a user device (e.g., UEe).

In still a further aspect of the disclosure, a method for mitigating packet loss in a wireless network is described. In one embodiment, the method includes identifying a user device (e.g., 3GPP UEe) experiencing overscheduling (or which is otherwise likely to experience overflow), and based at least thereon, configuring the UE via one or more of access nodes in the wireless network to enable delay requests for HARQ on the UL channel; receiving the delay request from the configured UE; and determining whether to delay one or more HARQ process or not.

In yet another aspect, methods and apparatus for coordinating the operation of two or more wireless network to prevent or mitigate wireless device buffer overflow and/or packet loss is disclosed. In one embodiment, the two or more networks include respective 3GPP PLMNs, and the wireless device includes a 3GPP 5G NR UEe with L1 and L2 buffers and MUSIM capability for each of the two or more networks, and the methods/apparatus include cooperation between the two networks to reduce or throttle aggregate data flows to the UEe.

In a further aspect, methods and apparatus for accommodating reduced-capacity user device configurations within a wireless network are disclosed. In one embodiment, the methods and apparatus implement signaling between the mobile device and two or more networks with which it is in data communication in order to reduce data flows below maximum values otherwise assumed by the network(s) for more capable or generic user devices.

In another aspect, a method of data processing of a user device connected to two or more wireless access nodes is disclosed. In one embodiment, the method includes: monitoring scheduled data activity relating to two or more data connections between the user device and respective ones of the two or more wireless access nodes; determining that the user device is overscheduled; and based at least on the determining, causing the user device to send a delay request to delay one or more buffer-consumptive processes for at least one of the two or more connections.

In one variant, the request to delay is configured based at least on a priority of each of the two or more connections.

In another variant, the method further comprises processing one or more buffer-consumptive processes for a non-delayed one of the two or more connections to completion before processing the delayed one or more buffer-consumptive processes.

In another variant, the method further comprises processing one or more buffer-consumptive processes for a non-delayed one of the two or more connections to a point of partial completion before processing the delayed one or more buffer-consumptive processes, the point of partial completion comprising a point wherein processing of both delayed and non-delayed processes will not overflow a designated buffer of the user device.

In another variant, the one or more wireless access nodes each comprise 3GPP gNodeB devices, and the non-delayed one or more buffer-consumptive processes each comprise a HARQ (hybrid automatic retransmission request) process.

In one implementation, the sending of the user request comprises sending an information element (IE) to at least one of the gNodeB devices.

In another aspect of the disclosure, a method of connecting a wireless user device to multiple wireless networks is disclosed. In one embodiment, the method includes: evaluating a scheduling load for the user device with respect to each of the multiple networks; based at least on the evaluation, computing a respective allocation for each one of the networks indicating a portion of a prescribed value to be scheduled by the respective one of the networks; based at least on the allocation for each one of the networks, allocating a portion of a data buffer of the user device to each one of the networks; configuring information elements (IEs) for use in Radio Link Layer (RLC) communications with respective ones of the networks, the respective IEs including the respective allocation for the ones of the networks; and transmitting the IEs to respective ones of the networks to alter scheduling behavior thereof.

In a further aspect, a computer readable apparatus configured for use in a wireless user device is disclosed. In one embodiment, the computer readable apparatus includes at least one computer program having a plurality of instructions configured to, when executed on a processing apparatus of the wireless user device, estimate buffer size for the wireless user device based on connectivity via at least: determination of whether a multi-connectivity mode of the wireless user device is to be used; based at least on the determination indicating that the multi-connectivity mode is not to be used, causing computation of a first value, and multiplication of the first value by a number related to a SIM (subscriber identity module) configuration of the user device to compute an estimated buffer size.

In one variant the plurality of instructions are further configured to, based at least on the determination indicating that the multi-connectivity mode is to be used: cause computation of a second value, and multiplication of the second value by a number related to a SIM (subscriber identity module) configuration of the user device to compute an estimated buffer size, to produce a third value; cause computation of a fourth value, and multiplication of the second value by a number related to a SIM (subscriber identity module) configuration of the user device to compute an estimated buffer size, to produce a fifth value; and cause computation of the buffer size as the larger of the third or the fifth values.

In one implementation, the number related to a SIM configuration comprises a number of respective PLMNs to which the user device can connect simultaneously via respective SIM credentials.

In a further aspect, an integrated circuit (IC) apparatus is disclosed. In one embodiment, the IC apparatus includes one or more individual ICs or chips that are configured to contain or implement computerized logic configured to enable buffer management within a wireless-enabled user device.

In yet a further aspect, a "smart" integrated circuit (IC) memory apparatus is disclosed. In one embodiment, the IC memory apparatus includes one or more individual ICs or chips that are configured to perform L1 and/or L2 buffer and buffer management logic functions for a 3GPP UE device during e.g., MUSIM operation.

In still a further aspect, SIM apparatus is disclosed. In one embodiment, the SIM apparatus includes one or more individual ICs or chips that are configured to enable connection to at least one mobile network, as well as comprising logic to support buffer management within a host wireless-enabled user device (e.g., 3GPP MUSIM UE) within which the SIM apparatus is used. In one variant, the SIM apparatus is removable and includes at least portions of logic or data to communicate with the host device and/or authorized network that the UE is buffer management-enabled. In one implementation, the SIM apparatus is a physical SIM or mini-SIM or micro-SIM card or form factor.

In another variant, the SIM apparatus is embodied as an e-SIM or electronic SIM, such as may be stored in a SE (secure element) or other physical device of the UE.

In another aspect, an enhanced wireless user device (e.g., UEe) is disclosed. In one embodiment, the wireless device comprises a single receiver (single Rx) device capable of connecting with multiple networks in sequence. In another embodiment, the wireless device comprises a multiple-Rx (e.g., dual-Rx) device which can connect to two or more networks simultaneously.

These and other aspects shall become apparent when considered in light of the disclosure provided herein.

BRIEF DESCRIPTION OF THE DRAWINGS

FIG. 1 is a tabular representation of exemplary prior art 3GPP LTE DL physical layer parameters set based on UE Category.

FIG. 2 is a tabular representation of exemplary prior art 3GPP Layer 2 (L2) buffer sizes as a function of UE Category.

FIG. 9 is a logical flow diagram illustrating a general methodology of buffer management for a user device within a wireless network according to the present disclosure.

FIG. 10 is a logical flow diagram illustrating one implementation of the general methodology of buffer management of FIG. 9, in the context of multiple PLMN's associated with a 3GPP enhanced UE (UEe).

FIGS. 13A-13B are tabular representations of prior art 3GPP MAC-Parameter and PHY-Parameter IEs.

FIG. 15 is a tabular representation of another embodiment of an enhanced 3GPP PHY_Parameter IE including maxHARQprocess fields according to the present disclosure.

FIG. 18 is a tabular representation of one embodiment of a 3GPP UCI parameter IE according to the present disclosure.

FIGS. 3-10, 11-12, and 14-26 © Copyright 2020 Charter Communications Operating, LLC. All rights reserved.

DETAILED DESCRIPTION

Figure 3:
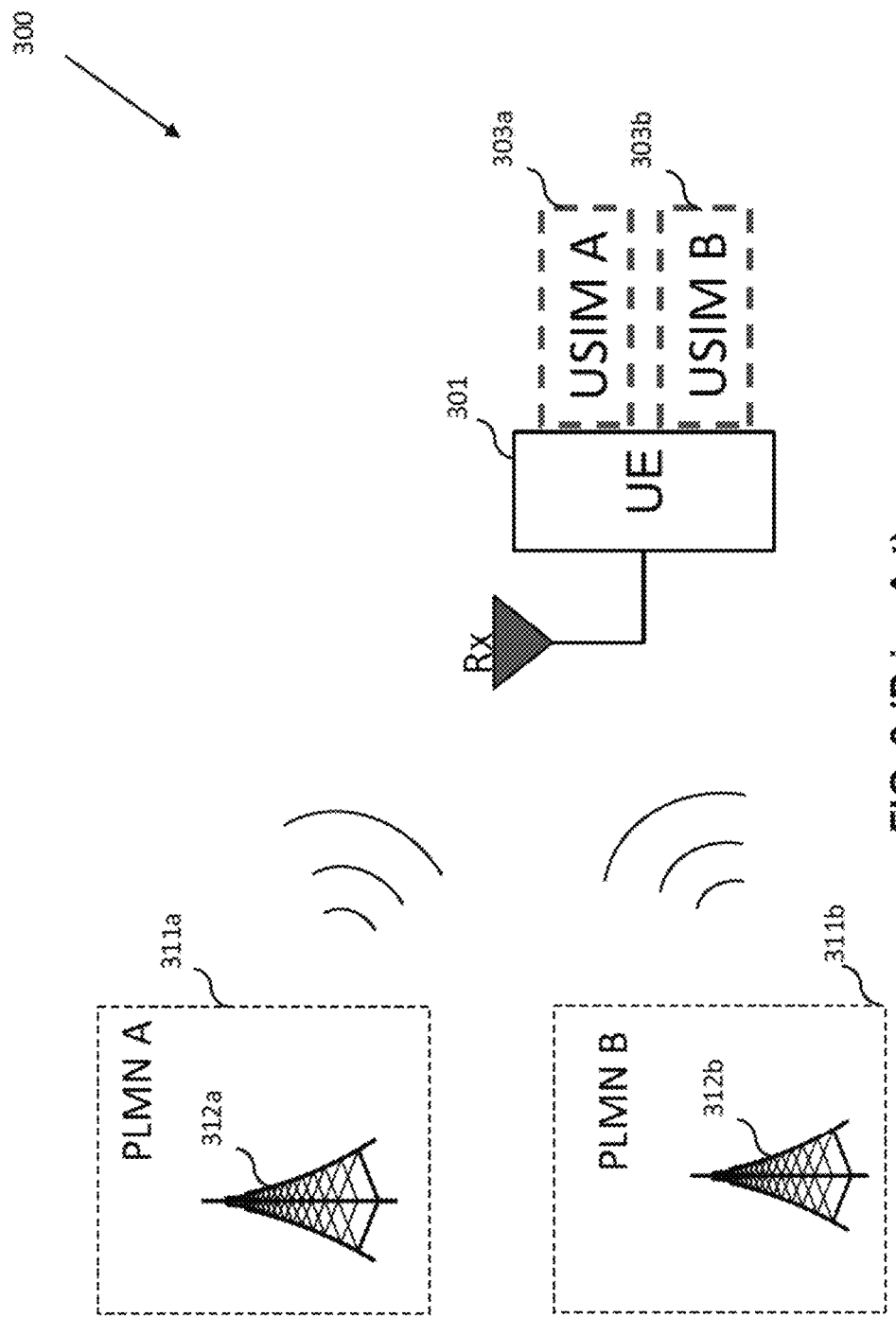
FIGS. 3-4 are logical block diagrams illustrating a prior art MUSIM architecture including UE and multiple PLMNs.
Figure 4:
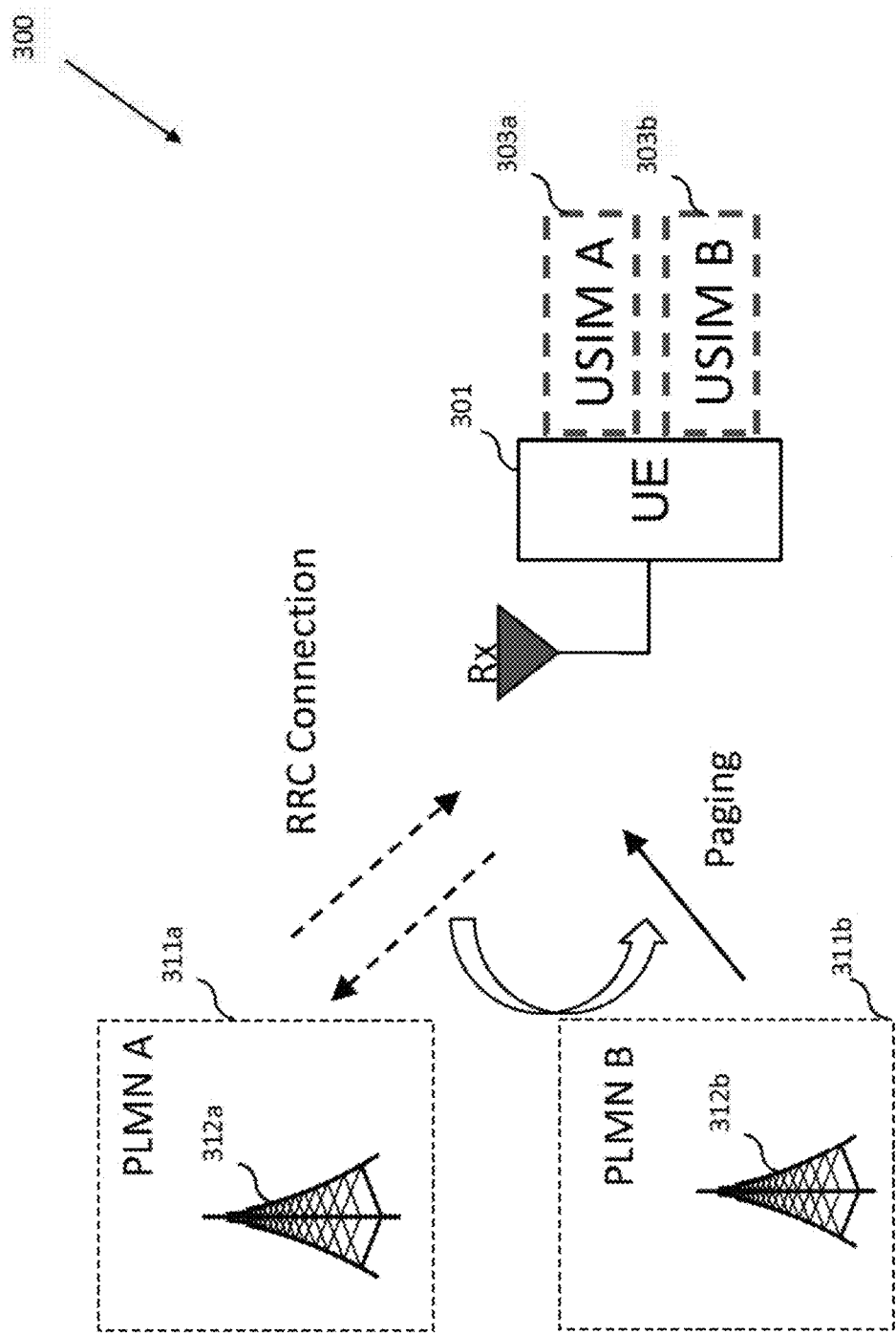

Reference is now made to the drawings wherein like numerals refer to like parts throughout.

As used herein, the term "access node" refers generally and without limitation to a network node which enables communication between a user or client device and another entity within a network, such as for example a CBRS CBSD, or a cellular gNB.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)— Citizens Broadband Radio Service Device (CBSD) Interface Technical Specification—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

Overview

In one exemplary aspect, the present disclosure provides methods and apparatus for providing enhanced wireless services via, inter alia, efficient buffer management techniques that mitigate buffers overflows/packet losses, including for user devices with multiple SIMS, or scenarios where the user devices are otherwise connectable to multiple networks simultaneously.

In one embodiment, a signaling architecture for 5G NR L1 and L2 buffer-related parameters from an enhanced MUSIM UE (UEe) to the network is provided. In one variant, this signaling architecture mitigates or even eliminates buffer overflow, via data sent during the UEe capability signaling process to each of the networks to which the MUSIM UE connects.

In another variant, a UEe that can connect to multiple independent networks can signal L2 buffer scaling or weighting factors so as to establish proportional scheduling by each network to the UE so as to avoid buffer overflow. In one variant, the L2 buffer is divided between the multiple networks proportional to the assigned scaling factors.

In another variant, the multiple networks have some level of coordination, and hence the UEe can interact (including transmission of buffer-related data) with only one network for buffer management, Similarly, if one network is higher priority than the other network(s), the UEe may report multiple scaling factors or other buffer-related data to the first network only.

In another embodiment, a capability for signaling a maximum number of DL and UL HARQ processes supported by the UEe is provided. The capability signaling is included e.g., in either IE MAC-Parameters or PHY-Parameters information.

A method for buffer management techniques performed by the MUSIM UEe is also described. In one variant, each USIM is assigned at least one virtual soft buffer for its corresponding HARQ process.

Methods and apparatus for HARQ process management and preauthorization rules are also described, so as to mitigate or prevent L1 buffer overflow. In one implementation, the UEe requests from the network to delay further scheduling of HARQ transmission/retransmission for a HARQ process being ACKed. The virtual buffer resources for those HARQ processes of the UEe can then be reallocated to another network.

DETAILED DESCRIPTION OF EXEMPLARY EMBODIMENTS

Exemplary embodiments of the apparatus and methods of the present disclosure are now described in detail. While these exemplary embodiments (and the discussion of identified issues present in the prior art) are described in the context of the previously mentioned user devices (e.g., enhanced 3GPP UEs) and wireless access nodes (e.g., gNBs) associated with or supported at least in part by a managed network of a service provider (e.g., MSO and/or MNO networks), other types of radio access technologies ("RATs"), and other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Also, while certain aspects such as certain types of PDU sessions are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the various aspects of the present disclosure contemplate use of quasi-licensed spectrum (such as CBRS spectrum in the 3.5 GHz band (specifically 3,550 to 3,700 MHz) in place or in addition to licensed or unlicensed spectrum, it will be appreciated by those of ordinary skill when provided the present disclosure that the methods and apparatus described herein may be configured to utilize other "quasi-licensed" or shared access systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Further, while some aspects of the present disclosure are described in detail with respect to so-called 5G "New Radio" (3GPP Release 15 and TS 38.XXX Series Standards and beyond), such aspects are in some cases access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Network Architecture—

Figure 5:
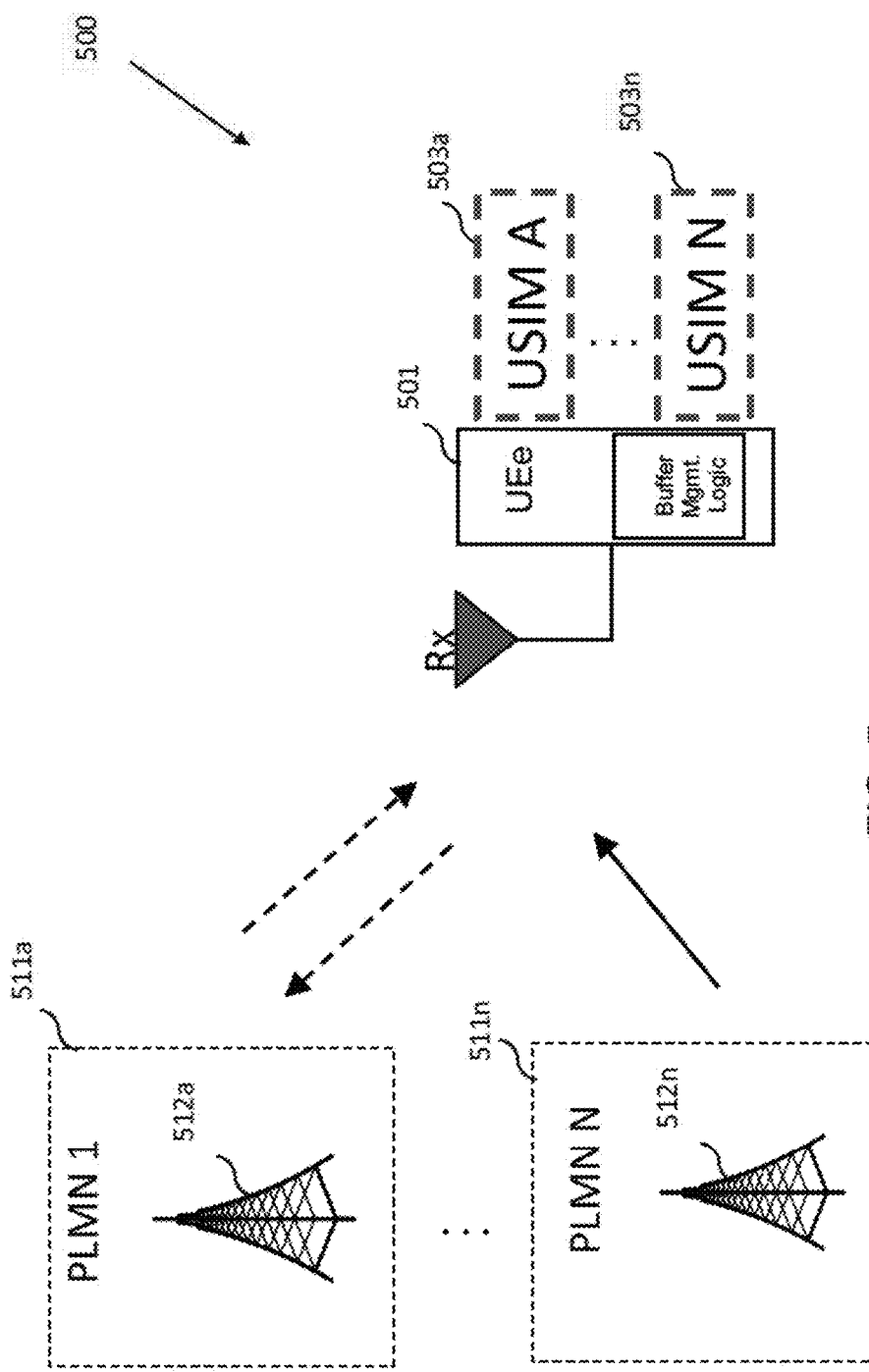
FIG. 5 is a logical block diagram of one embodiment of an enhanced MUSIM architecture including UEe and multiple PLMN's according to the disclosure.

Referring to FIG. 5, one embodiment of a Multi-Universal Subscriber Identity Module (MUSIM) NR enhanced UE (UEe) architecture 500 is shown and described. In this architecture, each USIM 503a through 503n of the UEe 501 is associated with a respective one of the Public Land Mobile Networks (PLMN's) 511a through 511n, the latter including one or more enhanced gNBs (gNBe's) 512a through 512n. The architecture is compliant with 3GPP Release 17, and may include inter-MNO/MSO and intra-MNO/MSO MUSIM use cases. Additionally, the architecture 500 may also support Multiple RAT concurrency scenarios, such as LTE-only+NR Stand Alone (SA), or NR SA+NR SA. The UEe may be of any types supported by Release 17 including for example a dual Rx single Tx UEe that can simultaneously receive from two different networks, and/or dual Tx/Rx UEe that can both receive and transmit simultaneously with two networks.

As previously described above, L1 and L2 buffer overflow occurs when more data is put into L1 and L2 buffer than their capacity ("overscheduling"). This buffer overflow may be seen in, e.g., MUSIM scenarios when the UE must receive data from multiple uncoordinated networks. Specifically, without coordination between the different networks for which a MUSIM UE 301 has been provisioned, the combined instantaneous downlink data from both networks may exceed the L1 soft buffer and/or L2 buffer capacity of the UE. Also, from the network perspective, Release 16 gNBs may not be able to guarantee the UE that an L2 buffer overflow will not occur. If such overflow occurs, the UE may discard packets in the L2 buffer, thereby resulting in packet loss.

The buffer overflow may be more severe in Release 17 Dual Connectivity (DC) than Release 15/16 Dual Connectivity (DC) scenarios as well as previously noted.

The UEe 501 and architecture 500 of FIG. 5 overcome the foregoing disabilities by including (depending on particular configuration) provision for signaling of NR UEe L1 or L2 buffers sizes/capabilities to the network, the latter also including logic to utilize the signaled data from the UEe(s) in order to modify their own behavior. Moreover, the lower complexity or "thinner" Release-17 UEe's such as "NR-Light" UEs that have lower peak throughput and hardware complexity (including reduced aggregate and individual buffer sizes) can be utilized within the architecture 500, thereby expanding the range of the types of device which can successfully operate within the network(s) 511a through 511n. As discussed in greater detail subsequently herein, logic within both the UEe's 501 and the networks 511a-511n enables effective buffer management via, inter alia, data tran Distributed gNB Architectures—

Figure 6:
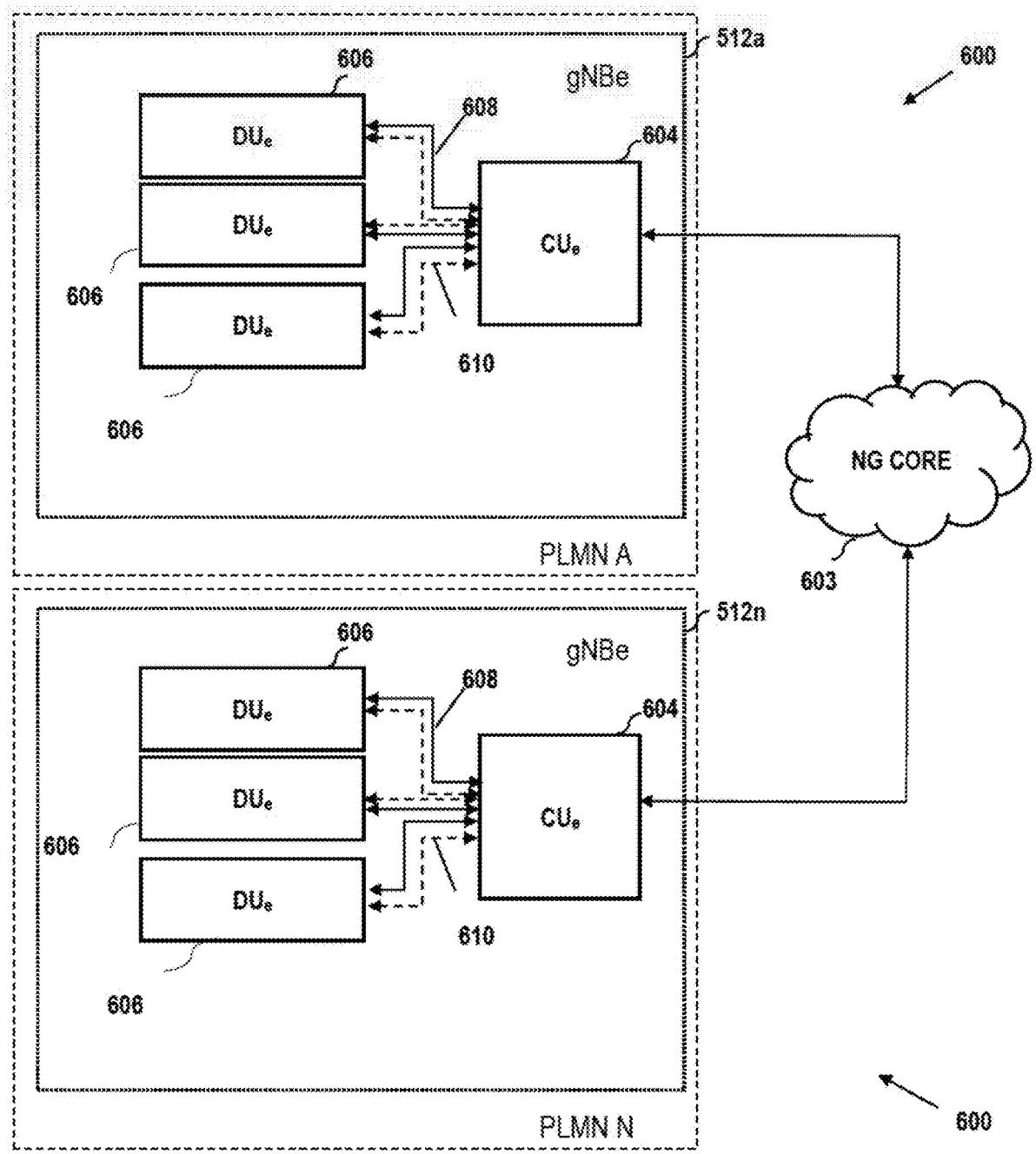
FIG. 6 illustrates a first embodiment of an enhanced gNB CU/DU (CUe/DUe) architecture according to the disclosure.
Figure 7:
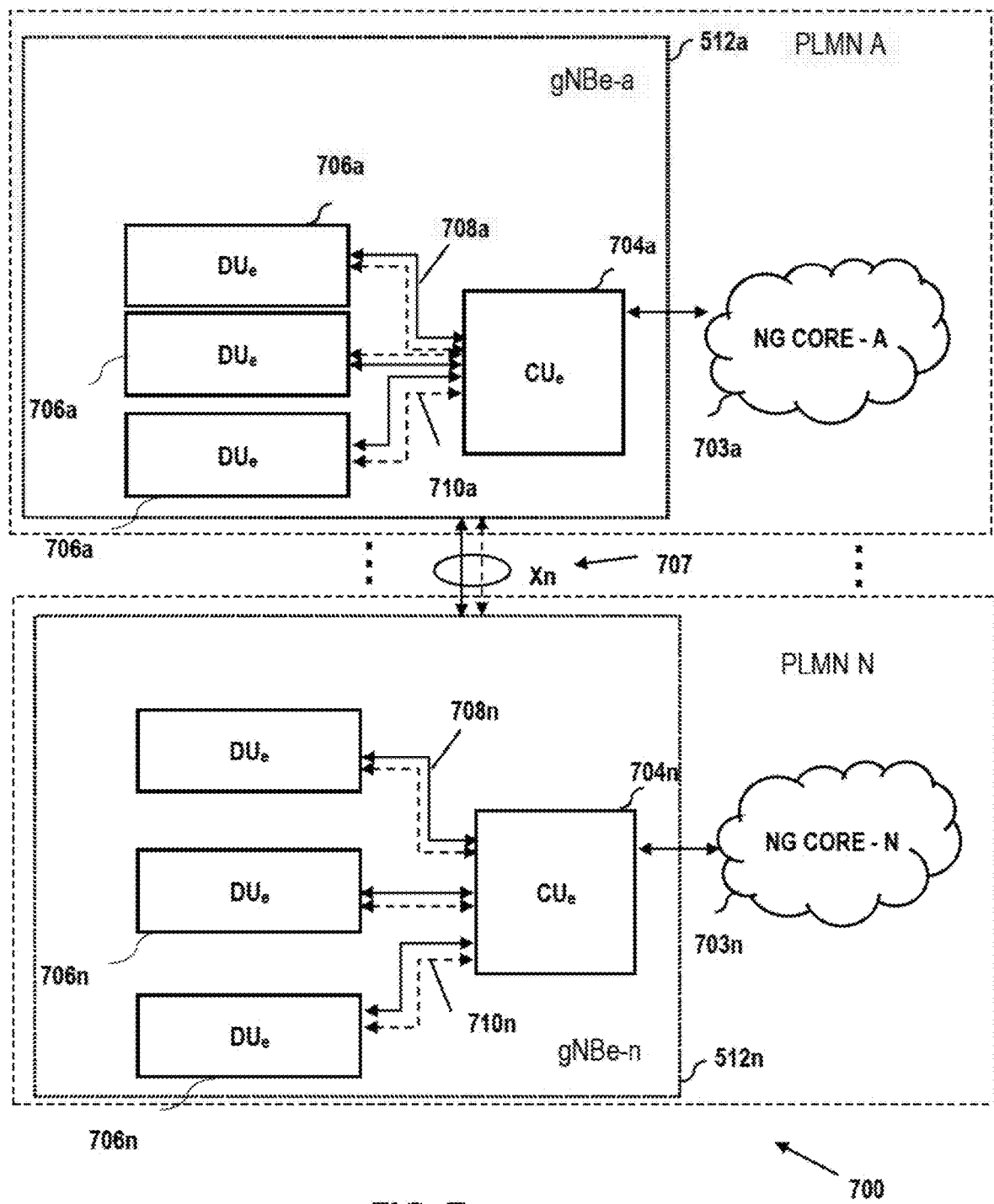
FIG. 7 illustrates a second embodiment of an enhanced gNB CU/DU (CUe/DUe) architecture according to the disclosure.
Figure 8:
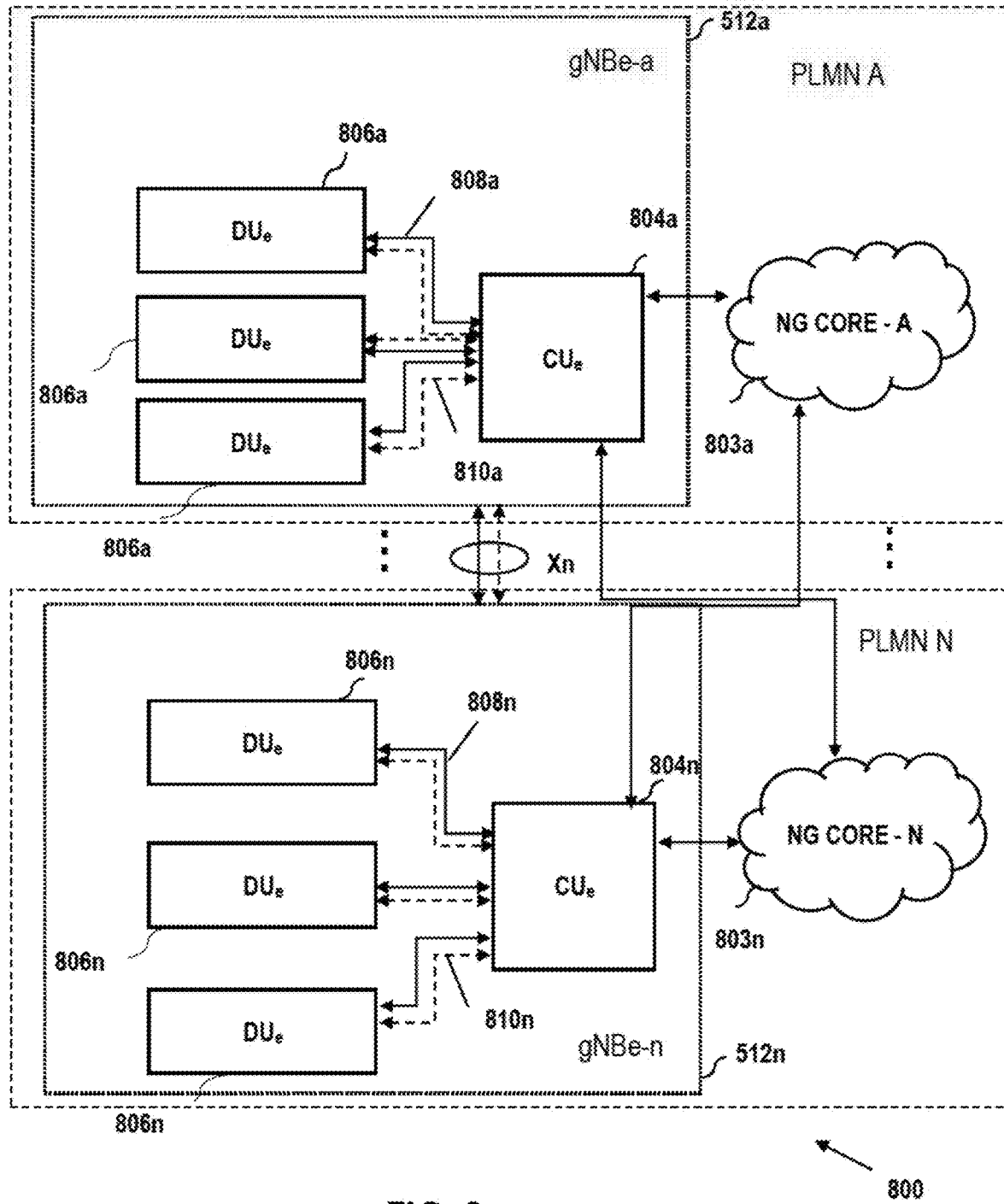
FIG. 8 illustrates a third embodiment of an enhanced gNB CU/DU (CUe/DUe) architecture according to the disclosure.

Referring now to FIGS. 6-8, various embodiments of a distributed (CUe/DUe) gNBe architecture according to the present disclosure are described. As shown in FIG. 6, a first architecture 600 includes two gNBes 512 having an enhanced CU (CUe) 604 and a plurality of enhanced DUs (DUe) 606. As described in greater detail subsequently herein, these enhanced entities are enabled to permit efficient UEe/Network signaling and UEe buffer management, whether autonomously or under control of another logical entity (such as the NG Core 603 with which the gNBe's communicate, or components thereof).

The individual DUe's 606 in FIG. 6 communicate data and messaging with the CUe 604 via interposed physical communication interfaces 608 and logical interfaces 610. Such interfaces may include a user plane and control plane, and be embodied in prescribed protocols such as F1AP. Operation of each DUe and CUe are described in greater detail subsequently herein; however, it will be noted that in this embodiment, one CUe 604 is associated with one or more DUe's 606, yet a given DUe is only associated with a single CUe. Likewise, each single CUe 604 is communicative with a single common NG Core 603, such as that operated by an MNO or MSO. One or more gNBe's may be associated with a given PLMN (one each shown for simplicity).

As a brief aside, a number of different identifiers are used in the NG-RAN architecture, including those of user equipment such as the UEe described herein, and for other network entities within the PLMN's. Specifically:

the AMF Identifier (AMF ID) is used to identify an AMF (Access and Mobility Management Function);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs (including gNBe's) within a PLMN, and is contained within the NCI of its cells;

the Global gNB ID, which is used to identify gNBs (and gNBe's) globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

In the architecture 700 of FIG. 7, two or more gNBe's 512a-n are communicative with one another via e.g., an Xn interface 707, and accordingly can conduct at least CUe to CUe data transfer and communication. Separate NG Cores 703a-n are used for control and user plane (and other) functions of the respective PLMNs.

In the architecture 800 of FIG. 8, two or more gNBe's 512a-n are communicative with one another via e.g., the Xn interface 807, and accordingly can conduct at least CUe to CUe data transfer and communication. Moreover, the separate NG Cores 803a-n are logically "cross-connected" to the gNBe's 802 of one or more other NG Cores, such that one core can utilize/control the infrastructure of another, and vice versa. This may be in "daisy chain" fashion (i.e., one gNBe is communicative one other NG Core other than its own, and that NG Core is communicate with yet one additional gNBe 802 other than its own, and so forth), or the gNBe's 802 and NG Cores 803 may form a "mesh" topology where multiple Cores 803 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MNOs/MSOs, which is especially useful in e.g., dense deployment environments which may not be able to support multiple sets of RAN infrastructure.

It will also be appreciated that while described primarily with respect to a unitary gNBe-CUe entity or device 804 as shown in FIGS. 6-8, the present disclosure is in no way limited to such architectures. For example, the techniques described herein may be implemented as part of a distributed or dis-aggregated or distributed CUe entity (e.g., one wherein the user plane and control plane functions of the CUe are dis-aggregated or distributed across two or more entities such as a CUe-C (control) and CUe-U (user)), and/or other functional divisions are employed.

It is also noted that heterogeneous architectures of eNBs or femtocells (i.e., E-UTRAN LTE/LTE-A Node B's or base stations) and gNBes may be utilized consistent with the architectures of FIGS. 6-8. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In the 5G NR model, the DU(s) comprise logical nodes that each may include varying subsets of the gNB functions, depending on the functional split option. DU operation is controlled by the CU (and ultimately for some functions by the NG Core). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s); and (ii) RRC, PDCP in the CUe (with split user plane and control plane stacks), and RLC, MAC, physical layer and RF in the DUe's.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe, while MAC, physical layer, and RF are maintained in the DUe's.

Under Option 5 (Intra-MAC split), RF, physical layer and lower part of the MAC layer (Low-MAC) are in the DUe's, while the higher part of the MAC layer (High-MAC), RLC and PDCP are in the CUe.

Under Option 6 (MAC-PHY split), the MAC and upper layers are in the CUe, while the PHY layer and RF are in the DUe's. The interface between the CUe and DUe's carries data, configuration, and scheduling-related information (e.g. Moduclation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's, while remaining functions reside in the CUe. In the DL, iFFT and CP addition may reside in the DUe, while the remainder of the PHY resides in the CUe.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

The foregoing split options are intended to enable flexible hardware implementations which allow scalable cost-effective solutions, as well as coordination for e.g., performance features, load management (including UE buffer management), and real-time performance optimization. Moreover configurable functional splits enable dynamic adaptation to various use cases and operational scenarios. Factors considered in determining how/when to implement such options can include for example: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It will also be appreciated that while not shown, mixtures or gNBe 512 and gNB (i.e., unenhanced gNBs), as well as DU/DUe and/or CU/CUe within those gNBe devices 512, may be used. For example, if a given DU is known to service only non-MUSIM devices, or MUSIM devices not potentially experiencing buffer overflow conditions, such DU may not need enhancement. As another example, if all enhanced buffer management functionality described herein is contained within the CUe of a given gNBe, enhanced DU (DUe) may be obviated. Similarly, if all buffer management logic is within one or more of the DUe, then a CUe may in some case be obviated.

Methodologies

Referring now to FIG. 9, one embodiment of a generalized method of utilizing scaling factors for control or management of wireless user device buffer(s) according to the disclosure is shown and described.

At step 903, the scheduling load from each network which the wireless device intends to connect to is evaluated. As discussed below, in come implementations, this evaluation may be performed by the wireless device (e.g., mobile user device), the network(s), or combinations thereof.

At step 905, based on the evaluated scheduling load, a scaling factor is assigned to each network. The scaling factor can be thought of as indicating the proportion of a buffer assigned to each network relative to the maximum buffer size.

At step 907, the scaling factors are signaled. For example, in one approach, the wireless user device signals the networks via their respective access nodes or base stations. Based thereon, the networks each the resources they can schedule to that particular wireless device.

At step 909, the networks schedule the wireless user device according the signaled scaling factors.

L2 Buffer Variants—

Turning now to the exemplary context of 3GPP 5G NR systems, FIG. 10 illustrates one implementation of the generalized methodology 900 of FIG. 9—utilizing L2 buffer scaling factors for various 3GPP networks (e.g., PLMNs).

At step 1001 of the method 1000, it is first determined whether multiple PLM networks are present to which the MUSIM UEe may connect. For instance, in one approach, logic on the UEe identifies the presence of the multiple PLMN's via signaling or paging or other transmissions received from each network. Note that each PLMN may also identify itself as being enhanced (e.g., able to implement buffer management and scaling) via one or more data IE's sent to the UEe 501 during such process.

If multiple PLMN's are detected at step 1001, then the method proceeds to step 1003. If not, the UEe is not under threat of buffer overflow, and a wait state 1002 is entered.

At step 1003, the UEe evaluates the scheduling load from each network of the multiple PLMN's to which the UEe intends to connect.

At step 1005, based on the evaluated scheduling load, the UEe assigns a scaling factor to each such network. The scaling factor indicates the L2 buffer assigned to each network relative to the maximum buffer size. Hence, in this embodiment, the scaling and delivery of data to the UEe is driven by the UEe itself, being most cognizant of its own capabilities in terms of buffer sizes, etc.

At step 1007, the UEe signals the determined scaling factors to respective networks (or, under scenarios where the PLMN's are communicative with one another, the scaling for each of the networks may be first routed to only one of the PLMN's, which then routes the applicable data to the others). Therefore, each of the networks know how much resources they can schedule to the UEe.

At step 1009, the networks schedule data for transmission to the UEe according the signaled scaling factors.

Figures 10A, 10B:
FIG. 10A is tabular representation of an exemplary prior art 3GPP RLC-Parameters Information Element (IE).
FIG. 10B is a tabular representation of one embodiment of a 3GPP RLC-Parameters IE according to according to the present disclosure.

FIG. 10A illustrates a prior art 5G NR IE (information element) used for signaling between a UE and the network, as specified in Table 4.2.5 specified in 3GPP TS 38.306 (see also TS 38.331).

By contrast, FIG. 10B illustrates one embodiment of an enhanced IE 1020 according to the disclosure, wherein additional L2 buffer scaling data 1021 is included. As in the method 1000 discussed above, the data is sent in this embodiment during the UEe 501 capability signaling process to one or more of the networks 511*a-n* for which the MUSIM UEe is provisioned, depending on the connectivity of the networks with each other. As shown in FIG. 10B and below, a new parameter (L2buffer-scaling) is added to the existing RLC-parameters Information Element (IE) in this embodiment:

```
-- ASN1START
-- TAG-RLC-PARAMETERS-START
RLC-Parameters ::= SEQUENCE {
    am-WithShortSN   ENUMERATED {supported}       OPTIONAL,
    um-WithShortSN   ENUMERATED {supported}       OPTIONAL,
    um-WithLongSN    ENUMERATED {supported}       OPTIONAL,
    L2buffer-scaling ENUMERATED {n1, n2, n4, n5,  OPTIONAL,
                                 n8, n9, n10}
    ...
}
-- TAG-RLC-PARAMETERS-STOP
-- ASN1STOP
```

The newly added L2 scaling parameter provides a scaling factor for the L2 buffer portion allocated to each network. For instance, the buffer size that the signaling UEe 501 would like to make available for scheduling by a particular network is indicated as a scaling factor (e.g., 0.1×, 0.2×, 0.4×, 0.5×, 0.8×, 0.9×, 1×) relative to the maximum buffer size value as specified in 3GGP TS38.306 and described previously.

In one variant, a UE that connects to two independent networks can signal an initial or default L2 buffer scaling factor (e.g., of 0.5) to each network in order to limit the possibility of a buffer overflow. This default value literally divides the data flow in half relative to maximum buffer size, and can be used in some cases as an initial estimate or starting point for scaling, presuming that the two participating PLMN's are roughly commensurate.

Figure 11:
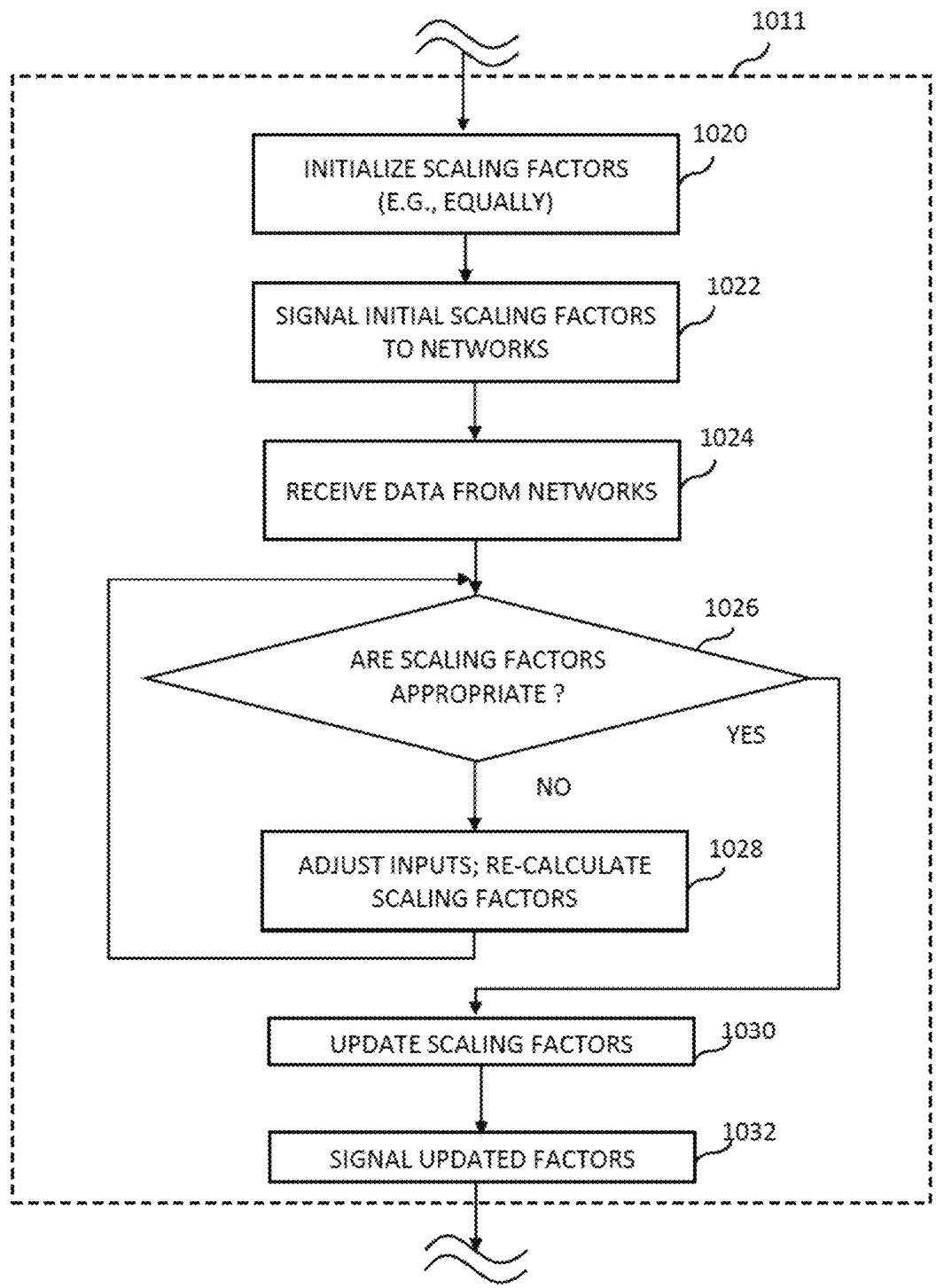
FIG. 11 is a logical flow diagram illustrating one implementation of the methodology of using scaling factors of FIG. 10.

FIG. 11 illustrates one specific embodiment for step 1005 of the method 1000 for providing the scaling factors to the networks according to the present disclosure using the foregoing initial estimate approach.

At step 1020, the UEe assigns equal scaling factors to the two networks (e.g., 0.5 to network A, and 0.5 to network B), and signals the scaling weights to the networks per step 1022.

At step 1024, the networks schedule the UEe according to signaled weights from the UE to networks, and the UEe starts receiving data from the networks.

At step 1026, the UEe monitors the throughputs from the networks (or other parameters useful in determining the relative loading for each network), and determines if the scaling weights can be optimized further to improve efficiency or meet some other desired goal. For instance, while buffer overflow/packet loss may be avoided from use of the initial scaling allocation, the total throughput of the networks may be non-optimized, including cases where one network is prioritized over the other. As an example, consider where PLMN-A carries high priority traffic, and PLMN-B carries low priority traffic (but much more volume than PLMN-A). In such a case, a 50-50 split may grossly underutilize PLMN-A, and throttle or bottleneck PLMN-B unnecessarily.

If the UEe determines that the scaling weights can be further optimized at step 1026 it proceed to step 1028, otherwise it proceeds to step 1030.

At step 1028, the UE re-calculates the scaling factors or weights, stores the new values locally per step 1030, and signals the new data to the network per step 1032. In one variant, the scaling weights are re-calculated based on e.g., (i) the expected scheduling load from each network, (ii) the prioritization, latency, and/or QoS requirements of the traffic being carried by each network, and (iii) the expected vs. actual data throughput realized from each network (a rough measure of actual channel conditions or link performance), and based on this evaluation the UEe optimizes the scaling factors.

Figure 12:
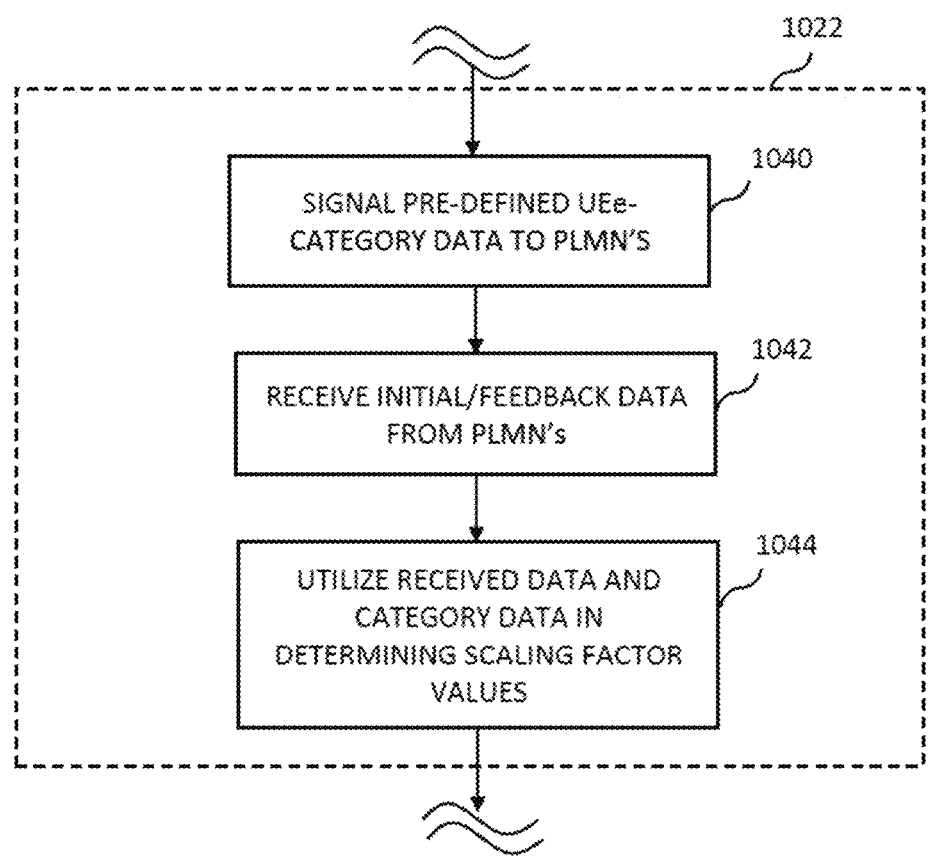
FIG. 12 is a logical flow diagram illustrating another implementation of the methodology of FIG. 10.

FIG. 12 illustrates another embodiment of the methodology of step 1022 of FIG. 10 (indicating the scaling factor for each network).

In this embodiment, the UEe 501 signals a predefined NR UE category to the networks (generally similar to Release-15) per step 1040. Similar to FIG. 1, where each category is mapped to a maximum L1 soft buffer size, this method maps each UEe category to a maximum L2 buffer size.

At step 1042, the UEe receives initial or feedback data from each of the PLMN's 511 for use in determining appropriate initial or follow-on scaling factors. For example, the networks may each provide a network-based estimate or recommendation of an initial scaling factor for the UEe to use. Such estimate may be based on, e.g., knowledge of the number of participating PLMN's (e.g., two, three, etc.), traffic loading or other conditions relevant to each PLMN of which the UEe may not be aware, traffic types to be carried, etc. In one such variant, the UEe 501 may further include a PLMN number parameter within an IE signaled to one or each network; even if the networks are not in communication with one another, each can autonomously determine how many other networks it will be "sharing" the UEe with prospectively, and adjust its initial recommendation accordingly.

The network (or the UEe, if provided sufficient data) may also calculate the recommended scaling weights for each network based on the expected load from each network, and maximum throughput defined by the relevant UE-Category. That is, the UE-Category may itself be used as a scaling factor for the total amount of throughput/capacity to be divided across the two or more PLMN's 511.

At step 1044, the UEe receives the data from the network (s), and the category data (known initially), and determines a scaling factor assignment based thereon, which may then be transmitted back to the network(s) as shown in FIG. 10.

In some variants, the multiple networks (PLMN's) belong to the same MNO/MSO, without any coordination or different MNO/MSOs being involved. In other cases, the PLMN's are distributed across two or more different network operators. In either case, each network may or may not be aware of the other network scheduling capacity for a specific UEe, depending on the particular configuration. As such, the present disclosure contemplates signaling between the UEe and the networks under any configuration, and in fact one embodiment of the UEe includes logic to support each of the foregoing scenarios. For instance, where the two or more PLMN's are part of the same network and communicative with one another (such status as signaled to the UEe), the UEe may adopt a protocol where it merely communicates with one of the PLMN's for scaling and buffer management, but with both (or more) PLMN's for actual user plane (UP) data transactions, with the scaling/buffer management data being distributed by the one PLMN receiving it. In other approaches, the two or more PLMN's are presumed to be wholly non-communicative with one another (regardless of whether managed by the same MSO/MNO or not), and as such the UEe will communicate with each individually for scaling/buffer management.

Hence, those of ordinary skill will recognize that the various embodiments of IE's shown herein may be readily adapted to these various scenarios, such as where a given IE contains multiple scaling factors or other data for different networks. For example, UEe 501 may report {n8, n4}, where the first value of the pair is the UE's actual total scaling factor, and the second value is the scaling factor the UEe intends to use for the given PLMN with which it communicating the data. The network may further respond with a modified second value that the UEe should expect to use on this network, which indirectly controls scaling factor (s) available for the remaining network(s).

L1 Buffer Variants—

FIG. 13 illustrates prior art IE MAC-Parameters as specified in Table 4.2.6 of 3GPP TS 38.306.

FIGS. 14A and 14B illustrate prior art PHY-Parameters specified in Table 4.2.7 of 3GPP TS 38.306.

As shown, existing 3GPP capability signaling protocols include relevant information regarding e.g., UE support of 256 QAM, and number of supported MIMO layers on the DL and UL. However, as previously noted, the capability of signaling data useful for UE buffer management (including the L1 buffer) is absent. To address this deficiency, additional capability signaling for the maximum number of DL and UL HARQ processes supported by the UE on a networks is utilized in various embodiments of the present disclosure. In the exemplary implementation, the foregoing signaling (data) is transmitted via either the IE MAC-Parameters or the Phy-Parameters information element used to convey physical layer parameters and includes other HARQ-related parameters. In this implementation, the data is configured to represent a total number of HARQ processes spanning dynamically scheduled and SPS/configured grants, which e.g., has a maximum value of 16 in Release 15 of 3GPP 5G NR standards.

Figure 14:
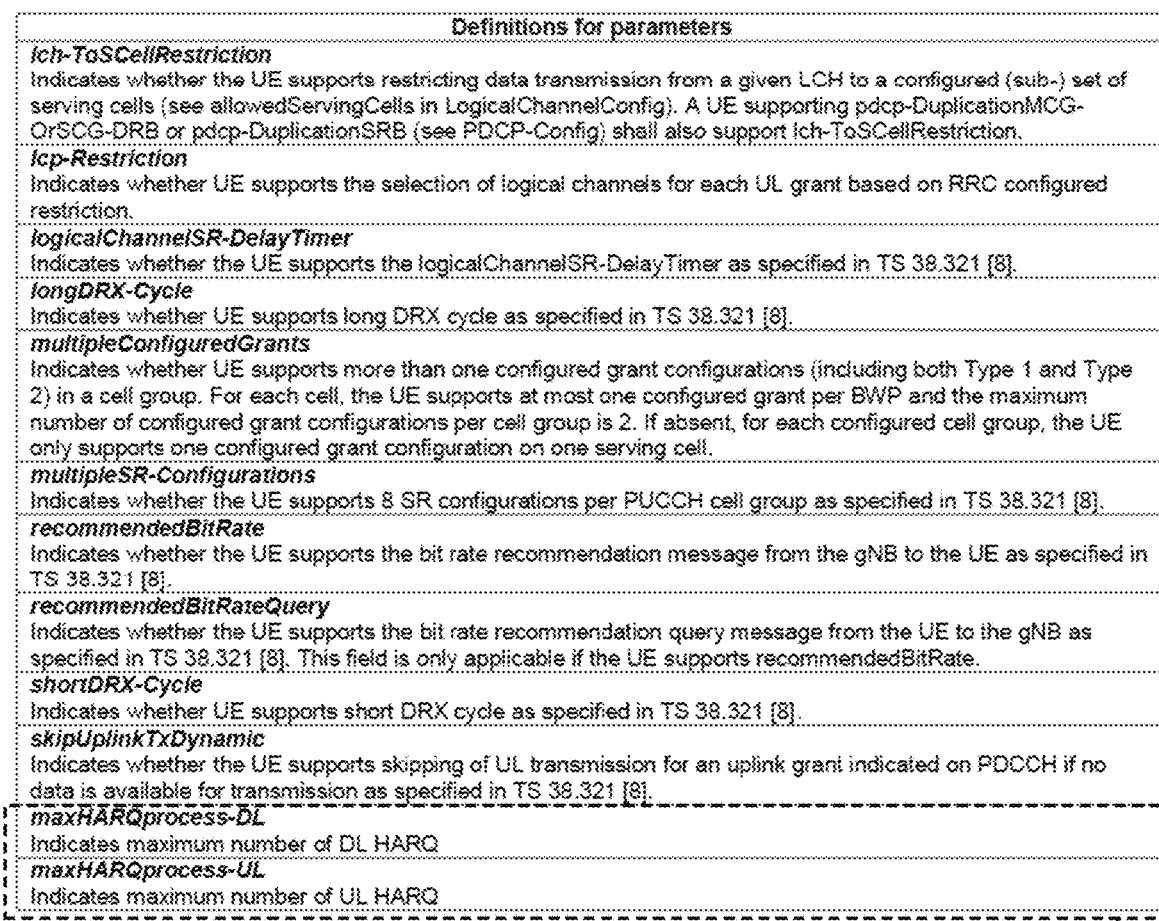
FIG. 14 is a tabular representation of one embodiment of an enhanced 3GPP MAC-Parameter IE including maxHARQprocess fields according to the present disclosure.

FIGS. 14 and 15 illustrate various implementations for capability signaling for the maximum number of DL and UL HARQ processes 1401, 1501 supported by the UEe on one or more of the PLMN's 511. As shown, this capability signaling is included in either the IE MAC-Parameters that conveys capabilities related to MAC (FIG. 14), or the Phy-Parameters IE that convey physical layer parameters (FIG. 15), and includes HARQ-related parameter data 1401, 1501. The proposed HARQ signaling for the MAC-Parameters or Phy-Parameters IE is defined as:

maxHARQprocess-DL INTEGER (1 . . . 16)
maxHARQprocess-UL INTEGER (1 . . . 16)

As a brief aside, the HARQ (Hybrid automatic repeat request) process is a 3GPP protocols which is a combination of high-rate Forward-Error-Correcting (FEC) coding and ARQ error-control. The HARQ process relies upon receiving an ACK for the transmitted packets. In HARQ, the sender sends a packet, and then waits for the ACK from the receiver before it sends another packet. The receiver decodes the packet, and if the packet is decoded correctly, it sends the ACK to the transmitter. If the transmitter does not receive the ACK, it resends the packet.

As such, as more HARQ processes are added to a given UEe/network connection, the possibility for buffer overflow and packet loss increases, since each HARQ process may, during periods when it is waiting for a corresponding ACK, accumulate or buffer data associated with that process.

For example, if a UEe 501 wants to transmit/receive Enhanced Mobile broadband (eMBB) traffic from both PLMN networks 511, it can construct and signal 8 HARQ processes to each network. In contrast, a UEe that wants to be perceived as a lower-throughput NR-light UEe on one network, and as an eMBB UE on the other(s), it can signal 4 HARQ processes to the former and 12 to the latter.

As such, the present disclosure contemplates a number of scenarios and configurations wherein the UEe 501 can adjust its "profile" to the networks so as to adjust their perception/ treatment of the UEe according to a desired model or template. Since the UEe is often the best entity to generate this profile (due to the fact that it has cognizance of its own capabilities, higher level processes, number of USIMs, etc.), exemplary configurations of the HARQ management processes described herein are based on the UEe conducting such analyses. However, as previously discussed, a portion or even all such evaluation can be offloaded to a proxy entity such as a network process (e.g., within a gNBe, AMFe, or even further back towards the 5GC).

Figure 16:
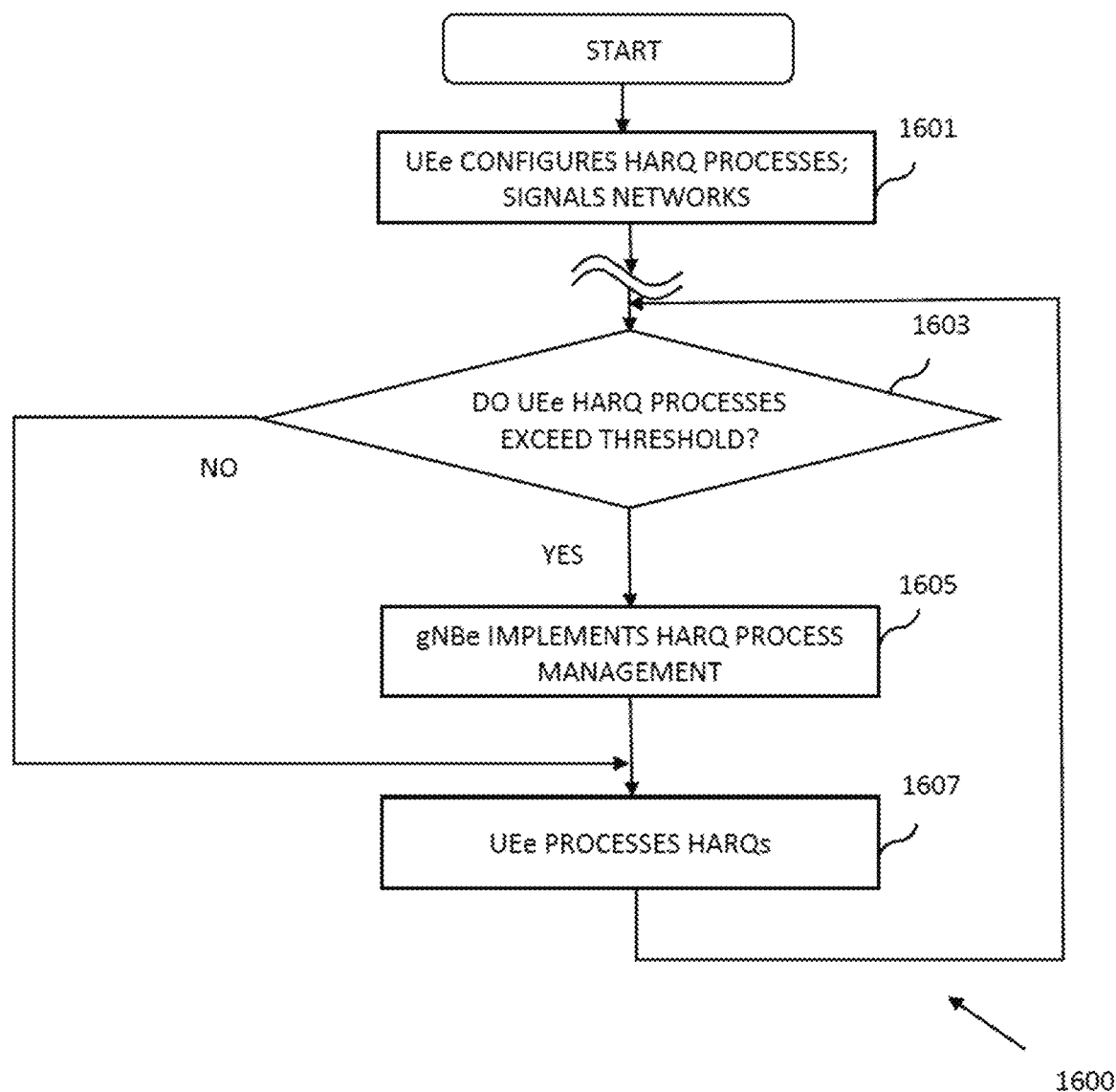
FIG. 16 is a logical flow diagram illustrating an exemplary embodiment of a method of using HARQ process control for buffer management according to the present disclosure.

Referring now to FIG. 16, one embodiment of the general methodology 1600 of processing HARQ requests/transactions according to the present disclosure is shown and described. It will be appreciated that while described in the exemplary context of a 5G NR system, the method may be adapted to other applications by those of ordinary skill given the present disclosure.

At step 1601, the UEe 501 configures its HARQ processes with respect to each of the participating networks 511, for instance using the foregoing maxHARQDL and maxHARQUL parameters of FIG. 14 or 15; i.e., according to its desired profile or template. These parameters are transmitted to the respective networks (or a single network where inter-network communication exists) via the applicable capabilities IE.

At step 1603, each network (e.g., gNBe 512) checks during operation if the given UEe exceeds the prescribed threshold for that network/UEe; i.e., whether the UEe/network is maintaining too many HARQ processes (and hence risking producing a buffer overflow condition).

Per step 1605, if the UEe/network is utilizing too high a number of HARQ process, the gNBe implements HARQ process management (which may include prioritization rules for different processes). Note that in one variant, the number of HARQ processes for each network DL/UL is determined by the above-referenced parameters signalled to the network (s); however, the actual selection and management (including prioritization of HARQ processes within that total maximum number for DL or UL) is left to the discretion of the network. As such, the network (e.g., gNBe) may construct a priority structure or order for various different HARQ processes based on e.g., traffic type/priority, QoS requirements, 5G NR network slicing considerations, or yet other factors.

Alternatively, other implementations of the present disclosure envision the UEe 501 having more capability in terms of not only specifying maximum HARQ DL/UL process number limits, but also prioritization. For example, in one such implementation (not shown), the IE's referenced above in FIGS. 14 and 15 can be modified to include yet further data, such as a HARQ process prioritization (e.g., HARQ Process 1-Priority 3, HARQ Process 2-Priority 1, and so forth). This data can be signalled to the network to instruct each PLMN to utilize whatever "HARQ resources" the UEe has requested according to the prescribed schedule.

Alternate Embodiments

Virtual Buffers and Delay Requesting—Referring now to FIGS. 17-20, additional embodiments of the buffer management methods and processes according to the present disclosure is shown and described. While not limited thereto, these techniques are particularly beneficial for, inter alia, dual-Rx and dual-Rx/Tx UEe's that receive data simultaneously from two or more networks (versus single-RX UEe's).

At a high level, the alternate embodiments of FIGS. 17-20 make use of a virtualized buffer model which can be flexibly allocated between different USIM processes (and hence PLMN's).

Figure 17:
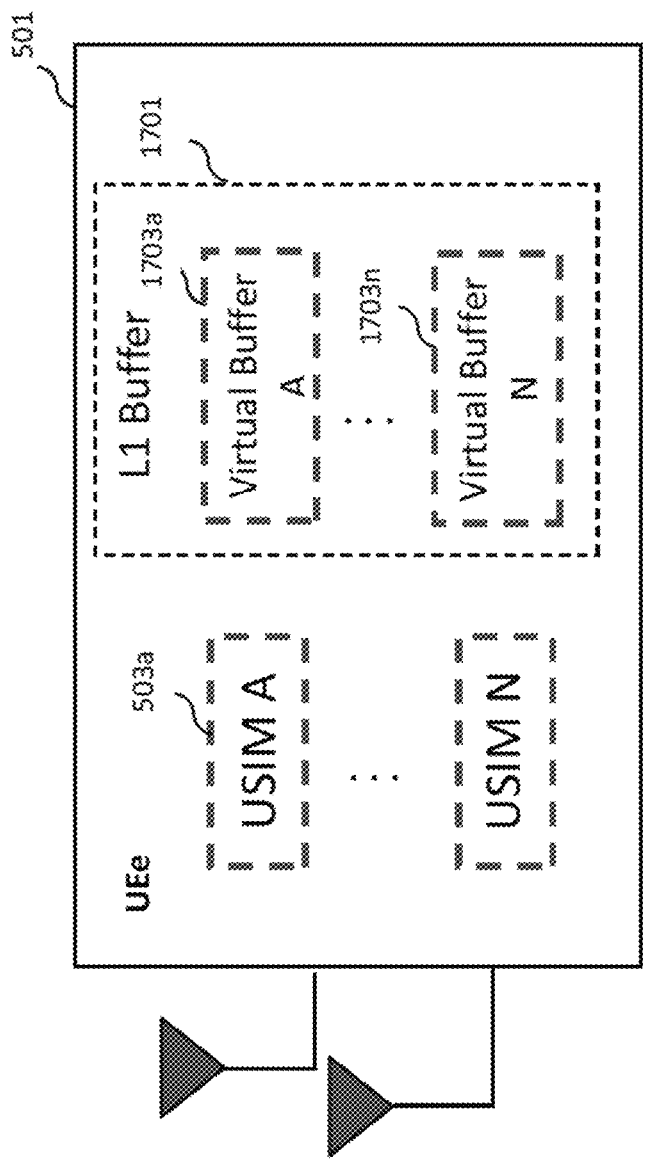
FIG. 17 is a high-level block diagram illustrating one embodiment of an enhanced virtual buffer-enabled UEe according to the present disclosure.

As shown in FIG. 17, in the exemplary embodiment, the physical L1 buffer 1701 of the MUSIM UEe is partitioned into multiple virtual L1 or "soft" buffers 1703$a$-$n$. In one implementation, each USIM is assigned at least one virtual soft buffer 1703 for its corresponding HARQ processes. This partitioning can be transparent to the network(s) associated with the USIMs, and is effectively an artificial construct maintained by the UEe 501 for purposes of managing HARQ processes. The relative sizes of the virtual buffers may be adjusted dynamically, depending on then-prevailing conditions. For instance, where a given USIM is not employed, its virtual buffer allocation may be given to another active PLMN. Or, in cases where traffic load is particularly heavy on one network connection, the (less loaded) PLMN buffer may offload part of its allocation to the more heavily loaded USIM for a period of time.

To this end, HARQ process management and prioritization rules can be defined for both the UEe and the participating network(s) in order to avoid UEe total L1 buffer overflow. For example, a UEe that is configured with a large number of HARQ processes with spatial multiplexing on two or more PLMN's may not be able to simultaneously process all of them given a limited physical buffer size of the device (especially true in cases of "thinner" capability UEe).

Referring again to FIG. 17, the L1 buffer of the UEe 501 is logically partitioned into virtual soft buffers 1703$a$-$n$. As one metric, the UEe DL throughput depends on the number of packets decoded correctly. If the packet is erroneously decoded by HARQ process, the UEe drops the packet, and sends a NACK signal to the network (gNBe) to invoke re-transmission of the packet, and this process continues until the packet is decoded correctly. Therefore, the number of HARQ processes which the UEe 501 can process simultaneously in such manner (which may vary depending on how many NACKs/retransmissions occur) effectively specifies the UEe throughput. In some variants, the rate at which NACK/retransmissions occur is monitored (e.g., across all HARQ processes globally, across DL or UL, or for individual processes) to obtain an assessment of how efficient the HARQ processes are (generally speaking), and scaling the number of DL/UL processes accordingly. For instance, N HARQ processes operating at peak efficiency may consume less buffer space than M processes operating at low efficiency (where N>M), and as such the present disclosure contemplates logic within the UEe (or network) capable of ascertaining and utilizing such efficiency data.

In exemplary embodiments, the above-referenced HARQ process management and prioritization rules are defined in two different cases, depending on the timing of DL-HARQ-ACK feedback from the UE to each network: 1) the PDSCHto-HARQ_feedback timing indicator in the DCI (downlink control information) of the PDSCH contains a numerical value that points to a specific upcoming slot in which to transmit the HARQ-ACK feedback for that PDSCH; or 2) the PDSCH-to-HARQ_feedback timing indicator in the DCI contains a non-numerical value that instructs the UEe to suppress the HARQ-ACK feedback for that PDSCH until further notice. Note that this latter feature was introduced in 3GPP Release 16. These two cases are now described in greater detail with respect to FIGS. 18-20.

1) Numerical PDSCH-to-HARQ_Feedback—

FIG. 18 illustrates an exemplary embodiment of Uplink Control Information (UCI) parameter data according to the present disclosure. The UCI data is transmitted on Physical Uplink Shared Channel (PUSCH) or Physical Uplink Control Channel (PUCCH). As shown in FIG. 18, the enhanced UCI data of the present embodiment includes the following parameters:

ACK/NCK, which indicates that DL packet is received and decoded correctly by the UE.

Scheduling Request (SR), which requests scheduling grant by the UE from the network.

Channel State Information (CSI), which indicates the quality of channel, and it includes subcomponents Channel Quality Indicator (CQI), Precoding Matrix Index (PMI), and Rank Indicator (RI).

Delay Request (DR), which allows UE to request the network to delay further scheduling of HARQ.

Due to the addition of the DR IE 1821 as shown in FIG. 18, the virtual buffer resources for those HARQ process can advantageously be reallocated to another USIM/network as previously described. Note also that the DR data can be multiplexed with existing UCI data such as HARQ-ACK bits and CSI feedback on PUCCH and PUSCH, and hence is completely compatible with existing protocols. The DR transmission is also configured by the higher layers in this exemplary embodiment.

The overall UCI bit sequence of the exemplary embodiment can be represented as:

$$a0, a1, a2, \ldots, aA-1 \qquad \text{Eqn. (4)}$$

where $A = O_{ACK} + O_{DR} + O_{SR} + O_{CSI}$ and represents the total number of ACK, DR, SR and CSI bits.

In one implementation, the number of DR bits is no more than that of ACK bits (i.e., $O_{DR} \le O_{ACK}$) In order to reduce overhead, 1 bit of the DR data can be associated with a delay request for 1 or more HARQ processes, where the association is configured by higher layers. Other schemes are also possible consistent with the present disclosure, including use of more than one bit, such as to enable more complex encodings of delay requests (DRs). For instance, a two-bit encoding may encode four (4) possible DR scenarios; e.g., (i) DR until further notice; (ii) DR with predetermined expiration timer; (iii) DR for multiple transport blocks; and (iv) DR for HARQ processes on a particular component carrier.

In addition, upon receiving DR data within the UCI, the network (gNBe) may decide not to schedule the HARQ-ACKed processes (or any of the other configured HARQ processes) for a pre-defined time duration (e.g., the HARQ RTT for the UEe).

2) Non-Numerical PDSCH-to-HARQ_Feedback

In the case where the PDSH-to-HARQ_feedback timing indicator in the DCI has a non-numerical value (indicating that the UEe is not required to send an immediate HARQ-ACK feedback), the UEe may send the HARQ-ACK feedback at a later time specified by for example logic within the UEe.

Specifically, when the PDSCH-to-HARQ timing indicator is not a numerical value, the UEe 501 may delay DL HARQ processing and feedback generation corresponding to a given USIM 503 of the MUSIM UEe 501, thereby lowering virtual buffer utilization for that USIM/network, while soft-combining of multiple (re)transmitted DL HARQ processes corresponding to one or more other USIMs 503 is in progress (i.e., a comparatively high virtual buffer utilization is allocated to the other USIM(s)). This prioritization can also advantageously be transparent to the network and contained within the UEe if desired.

Figure 19:
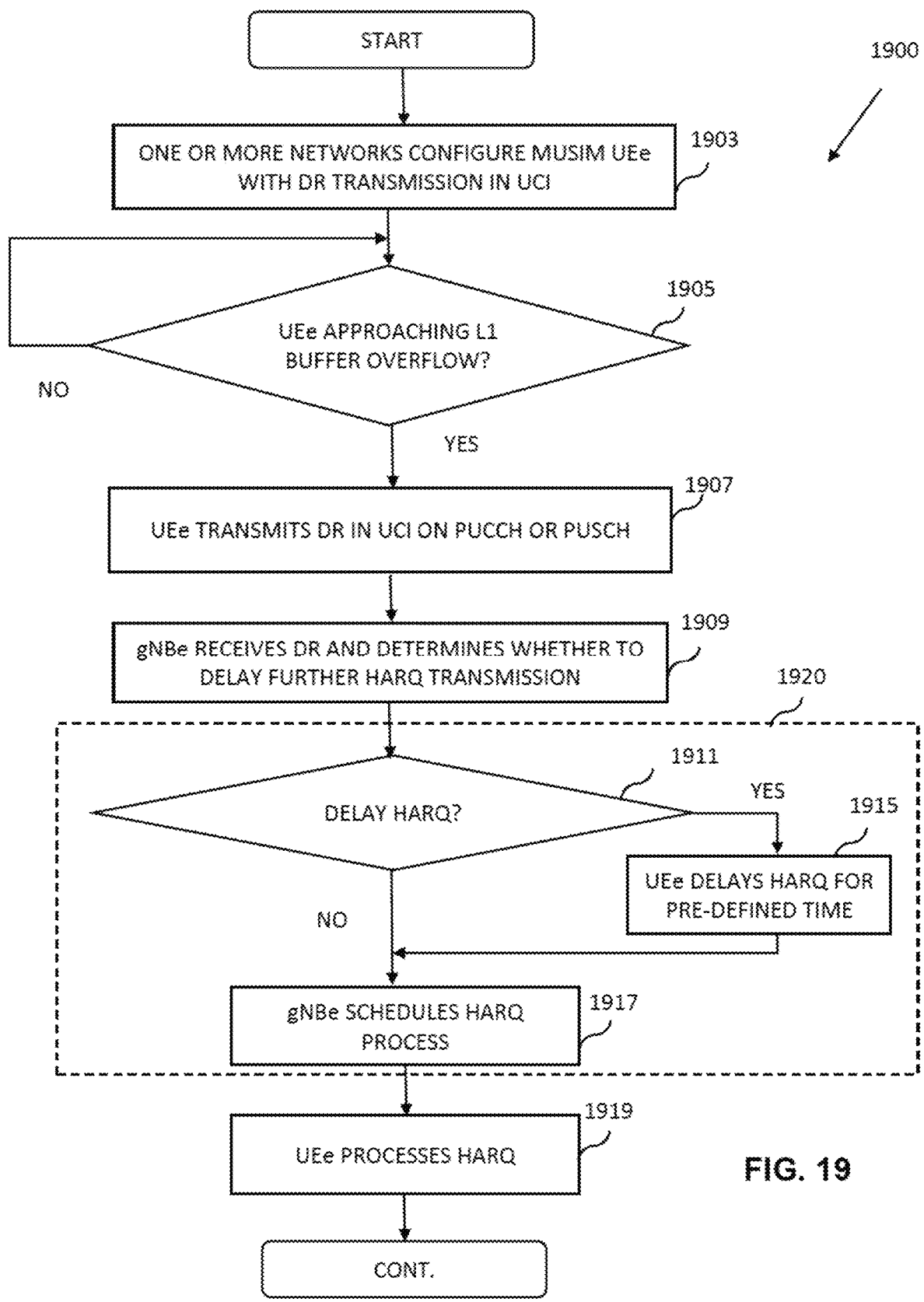
FIG. 19 is a logical flow diagram illustrating an exemplary embodiment of a method of utilizing uplink control information (UCI) for buffer management according to the present disclosure.

FIG. 19 illustrates one embodiment of a method 1900 for L1 buffer management and HARQ processing (in the exemplary context of a MUSIM UEe with reference to FIG. 17) according to the present disclosure. It will also appreciate that while the method 1900 of FIG. 19 is described herein for the case where the PDSCH-to-HARQ_feedback timing indicator in the DCI scheduling PDSCH contains a numerical value, it may readily be adapted by those of ordinary skill in the art given the present disclosure for the case where the PDSCH-to-HARQ_feedback timing indicator in the DCI scheduling PDSCH contains a non-numerical value as referenced above.

Per step 1903 of method 1900, one or more networks configure the MUSIM UEe 501 with DR transmission in UCI, such as via a gNBe within the network(s).

Per step 1905, the UEe is monitored to determine if it is approaching L1 buffer overflow. This may be accomplished by processes within the UEe for example. If the MUSIM UEe is not approaching overflow, it returns to step 1903, otherwise it proceeds to step 1907.

Per step 1907, the UEe transmits DR data in the UCI on a PUSCH or PUCCH, depending on the available resources on the PUCCH or PUSCH.

Per step 1909, the gNBe 512 receives the DR data from the UEe, and determines whether to delay HARQ transmission or not.

Per step 1911, if the gNBe decides to delay the HARQ transmission it proceeds to step 1915, and delays the relevant HARQ process(es) for a pre-defined time duration, or according to another delay parameter (e.g., number of occurrences of a prescribed event). If it decides not to delay, the method proceeds to step 1917, and schedules the HARQ-ACKed processes or any of the other configured HARQ processes.

Per step 1919, the UEe processes the transmitted HARQ process data, and decodes the packets.

In some variants, the UEe may delay the DL HARQ processing and ACK generation corresponding to one USIM of the multiple USIMs of the UEe so as to reduce virtual buffer utilization, while the soft-combining of multiple (re) transmitted DL HARQ processes corresponding to the other USIM(s) completes processing in the other virtual buffer(s).

It will also be appreciated that the methodology of FIG. 19 may be applied on a per-HARQ process basis, or more globally across multiple HARQ processes. For instance, two or more HARQ processes may be logically associated with one another (whether within the UEe or the gNBe or both) such that processing of one is tied to the utilization/processing of the other; e.g., wherein completion of one is a precondition to the other. Similarly, delay or non-delay of one may be applied to others regardless of any conditions precedent. As such, a "global" DR may also be used, wherein if any of the constituent HARQ processes within the specific set of processes is subject to a DR, then all are delayed similarly (or according to a prioritization order). Numerous other such permutations will be appreciated by those of ordinary skill given the present disclosure.

Figure 19A:
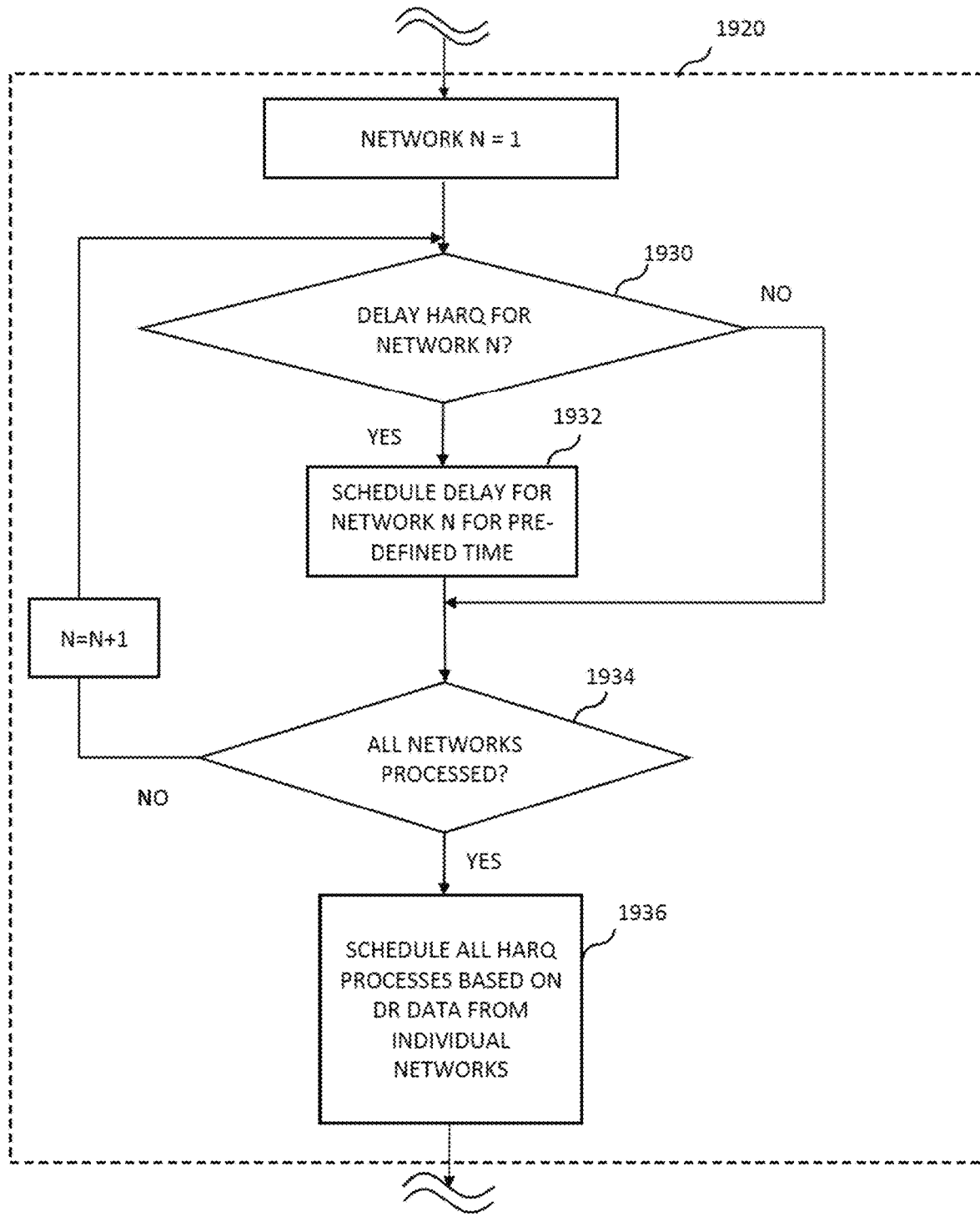
FIG. 19A is a logical flow diagram illustrating one implementation of the general methodology of HARQ-based buffer management of FIG. 19.

FIG. 19A illustrates one specific implementation of the method 1900 of delaying HARQ process according to the present disclosure. In this embodiment, the DR processing of two or more of N constituent PLMN's is performed on the network side, such as where the two PLMN's are communicative with one another regarding DR data received from a given UEe by each. In effect, the method of FIG. 19A gives the network a more "global" view at DR processing for a given UEe 501.

At step 1930, the UEe decides whether to delay HARQ process for a first network N=1, such as via a DR issued to that network. If it decides to delay the HARQ process it proceeds to step 1932, otherwise it proceeds to step 1934.

At step 1932, the UEe delays HARQ processing for the network N such as by issuing a DR to that network's gNBe. The network may schedule delay the HARQ process for e.g., a pre-defined time duration for some future time.

At step 1934, if all N networks associated with the UEe have not been processed, the counter N is incremented, and the foregoing steps repeated.

Once all networks have been processed, the scheduled future HARQ delays associated with all networks are evaluated (e.g., by the gNBe or another node thereof, or even by the UEe itself) so as to generate a collaborative or composite schedule for HARQ delays which is optimized at a higher layer of abstraction (e.g., which takes one or more UEe or network-based factors into consideration) such that the HARQ scheduling is optimized. This may also include UEe virtual buffer allocation scheduling as a function of the delay scheduling; e.g., so as to map the virtual buffer allocations between the various PLMN's/USIMs so as to maintain optimal utilization and efficiency without buffer overflow.

Figure 20:
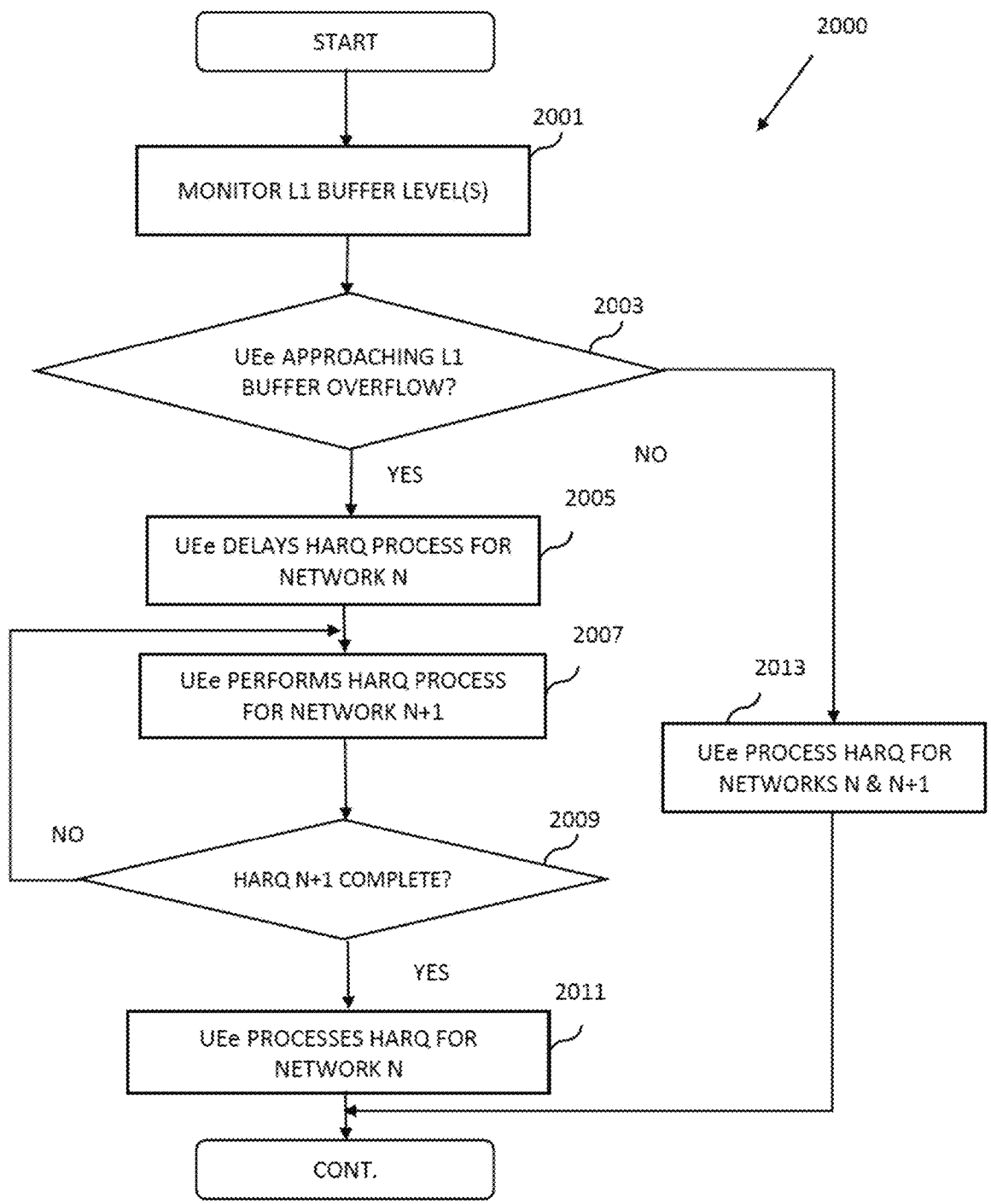
FIG. 20 is a logical flow diagram illustrating one methodology of HARQ-based buffer management, wherein network prioritization is employed.

FIG. 20 illustrates one embodiment for a methodology for L1 buffer management and HARQ processing for a MUSIM UEe, such as in the case when PDSCH-to-HARQ_feedback timing indicator in the DCI has a non-numerical value.

At step 2001, the UEe L1 buffer level is monitored (e.g., by a process on the UEe itself).

At step 2003, the UEe determines whether L1 buffer overflow is being approached, and if so the method proceeds to step 2005. Otherwise, the method proceeds to step 2013 to process HARQ for multiple networks (e.g., N and N+1) simultaneously.

At step 2005, the UEe delays the HARQ process for network N. Since the PDSCH-to-HARQ_feedback timing indicator in the DCI has a non-numerical, the UEe can delay ACK/NCK process for a non-pre-defined time, and the hence it does not need to inform the network of any delay it implements.

At step 2007, the UEe processes the HARQ processes for the network N+1 (the non-delayed network).

At step 2009, when the UEe completes processing for HARQs for network N+1, it proceeds to step 2011 to process the (delayed) HARQs for network N.

While the embodiment of FIG. 20 uses completion of the non-delayed HARQ N+1 processing as a criterion for the "delay" imposed on network N, it will be appreciated that other schemes may be used. For example, in one approach, the UEe estimates the delay value based on buffer proximity to overflow, or rate at which buffer level is increasing, with greater delay correlated to higher/faster level (changes), and avoids imposing a condition precedent of completion of HARQ processing for the other (non-delayed) network before processing of the HARQs for the delayed network can commence. Hence, the HARQ processing for the delayed network can "restart" earlier than full completion of the other network. The UEe may also estimate the delay needed to complete a given higher priority process on network N+1 (the non-delayed network), or otherwise obtain data on estimated completion and use that data as a basis for specifying the delay value.

Alternatively or concurrently, the UEe may consider how many total USIMs it is provisioned for (e.g., the logical loop of FIG. 20 may continue for N>2 networks, and as such it may be more aggressive with delays if more USIMs/connections are present).

Moreover, a buffer "low" or clearance value can be specified, such that once the buffer is worked down below a certain level during delay of the N HARQ processing in favor of that of network N+1, the suspension is lifted and processing for network N HARQs can be resumed.

Supplementary Uplink/SCG Variants—In yet other embodiments, if the UEe has been configured with a supplementary UL, or with a Secondary Cell Group (SCG) under DC (dual connectivity) for a given network—and thereby increasing the number of overall HARQ processes for the UEe—the UEe may initiate an RRC transmission to request a downgrade in the number of supplementary ULs, and/or cells in the SGC. This messaging in one implementation utilizes signaling radio bearer SRB1 or SRB3, RLC-SAP, AM, and a logical channel (e.g., DCCH).

Figure 21:
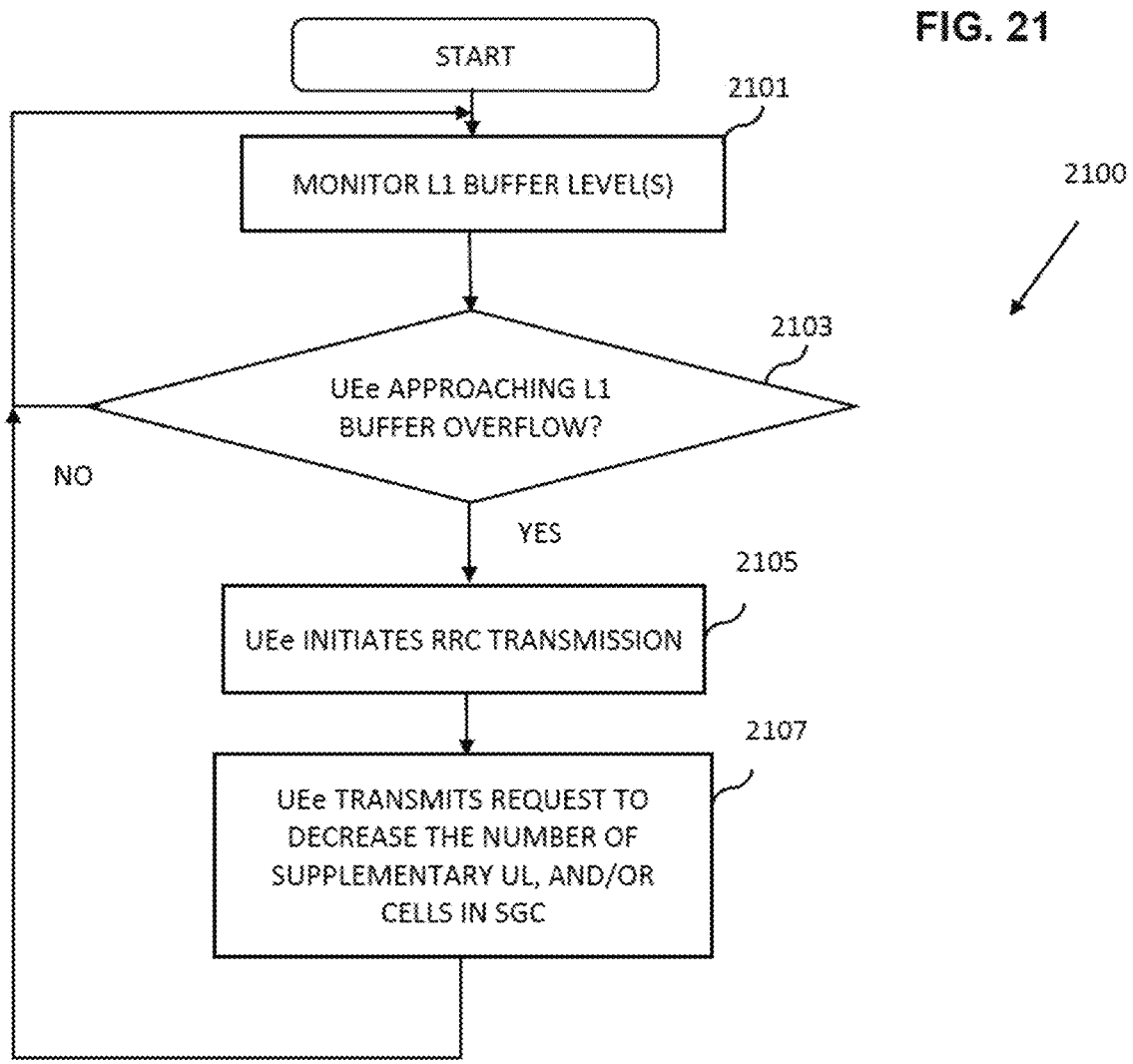
FIG. 21 is a logical flow diagram illustrating one embodiment of a method of supplementary UL or SCG-based L1 buffer management for a UEe connected to multiple PLMNs, according to the disclosure.

FIG. 21 illustrates one embodiment of a method of mitigating L1 buffer overflow when a UE is configured with a supplementary UL channel or SGC.

At step 2101, the UEe buffer level is monitored, and per step 2103, if the buffer is approaching overflow, the UEe initiates RRC transmission(s) to one or more of the USIM-associated networks 511 per step 2105 in order to enable reduction of allocation(s) to the UEe.

At step 2107, the UEe transmits one or more requests to decrease a number of one or more applicable resources (e.g., supplementary UL channels, and/or number of cells in SCG) to decrease the number of associated HARQ process. Note that the IEs associated with these requests (not shown) may be configured as a single-bit value (e.g., yes/no on whether to decrement the then-prevailing number of supplementary UL channels or SCG cells by one (1)), or alternatively may be encoded with ore information (such as an actual number by which to reduce, or a number to be left remaining, or yet other actions to be taken).

Figure 22:
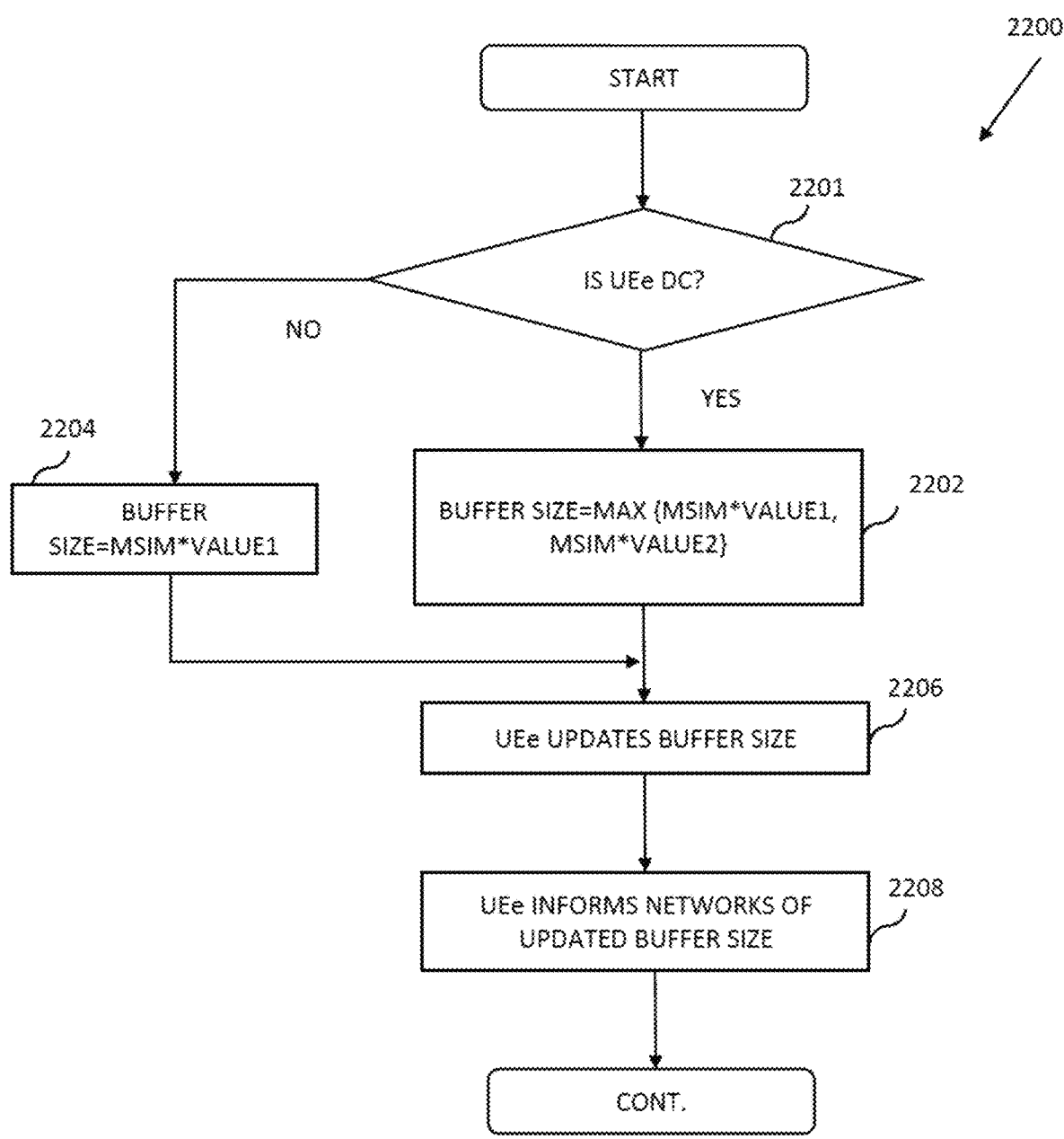
FIG. 22 is a logical flow diagram illustrating yet another embodiment of a method of L2 buffer management for DC and non-DC scenarios, according to the disclosure.

L2 Buffer Size Update—Referring now to FIG. 22, yet another embodiment of the buffer management methods and processes according to the present disclosure is shown and described.

At a high level, this alternate embodiment of FIG. 22 makes use of updated or enhanced maximum L2 buffer size computations and evaluations in the context of DC and non-DC scenarios to effectively manage buffer overflow within the UEe 501.

Specifically, the L2 buffer size described in 3GPP TS 38.306 considers the scenario when the UE is connected with only one PLMN. This deficiency can result in overflow and packet loss when two or more PLMNs are connected to a given UE.

Hence, the present disclosure presents an additional capability for updating the L2 buffer size for the UE that considers connection to multiple networks, so as to avoid the overflow. Two general scenarios arise in the context of multiple connected networks; (i) non-DC and (ii) DC.

For non-DC scenarios the following Eqn. (5) is used:

$$\text{Maximum L2 Buffer Size} = \text{MSIM} * \text{VALUE 1} \qquad \text{Eqn. (5)}$$

where:
VALUE 1=(MaxDLDataRate*RLC RTT+ MaxULDataRate*RLC RTT); and MSIM is the maximum number of USIMs supported (e.g., in Release 17).

For DC scenarios, the L2 buffer maximum is set to the maximum value of the calculated values based on the following Eqns. (6)-(7):

$$\{\text{MSIM} * \text{VALUE 2}\} \qquad \text{Eqn. (6)}$$

where:

VALUE 2=[MaxULDataRate_$MN$*RLCRTT_$MN$+ MaxULDataRate_$SN$*RLCRTT_$SN$+ MaxDLDataRate_$SN$*VALUE2=RLCRTT_$SN$+ MaxDLDataRate_$MN$*(RLCRTT_$SN$+X2/Xn delay+Queuing in $SN$)]{MSIM*VALUE3}  Eqn. (7)

where:

VALUE3=[MaxULDataRate_$MN$*RLCRTT_$MN$+ MaxULDataRate_$SN$*RLCRTT_$SN$+ MaxDLDataRate_$MN$*RLCRTT_$MN$+MaxDL- DataRate_$SN$*(RLCRTT_$MN$+X2/Xn delay+ Queuing in $MN$)]

FIG. 22 illustrates one embodiment of method for calculating the L2 buffer size according to the present disclosure.

At step 2201, if the UEe is configured for DC operation, the method proceeds to step 2202. Otherwise, the method proceeds to step 2204. In one implementation, this inquiry is performed at time of establishment or entry into a dual-connectivity mode of operation (i.e., invoked only when DC is actually utilized, or upon occurrence of another event), such that normal L2 buffer sizing applies otherwise. Alternatively, in some other implementations, the updated L2 buffer sizing is applied universally.

At step 2202, the UEe calculates the buffer size using either Eqns. (6) or (7) above.

Alternatively, per step 2204, if the UEe is not in DC mode, it calculates the buffer size per Eqn. (5) above.

At step 2206, the UEe updates its L2 buffer size, and at step 2208, informs the networks of the updated L2 buffer size, such as via a Capabilities or other IE of the type previously described. For example, the UEe may use an IE configured to report the actual size in absolute terms (e.g., number of MB or Mbits), relative to a predefined index (e.g., 2 of 5, where 2 corresponds to a predefined value or range of X MB or Mbits, and 5 corresponds to another value/range), or relative to a prior value (e.g., increased or decreased by Q increments relative to a prior reported value).

Combination/Hierarchy Logic—It is appreciated that although the various methodologies of FIGS. 9-22 described above are generally described in terms of either L1 or L2 buffer management, the two processes and buffers are intrinsically correlated to one another. Specifically, while the various methods are performed independently, they are at some level correlated in that processing associated with one layer (stores of data frames, removal of overhead, and parsing the data frames into frames to be stored in the buffer of the next layer, and processed on a packet-by-packet basis) is affected by the other. Therefore, for instance, changing L2 buffer scaling factors/weights (FIGS. 9-12) can affect HARQ processes (FIGS. 14-21), and hence L1 buffer overflow or packet loss. Similarly, entry into a DC mode of operation (FIG. 22) can cause change in the L2 buffer size, and hence the scaling factors or virtual buffer allocation rules may accordingly need to become more or less "aggressive" in relation thereto (e.g., a reduced L2 buffer update value may require quicker triggering of the delay logic of FIG. 20).

Furthermore, when the L2 scaling weights of FIGS. 9-12 are optimized to reduce overflow, L1 buffer overflow will be significantly mitigated as well.

Accordingly, various combinations of the foregoing methods are envisaged by the present disclosure.

Moreover, the present disclosure contemplates situation-dependent utilization of the methods described above, such as for example where one operational scenario (e.g., one number of different USIMs, types of HARQ processes, types of UP data traffic and associated latency/QoS requirements, types/category of UEe, and so forth) may be better served by using L2 buffer management versus L1 buffer management, or certain combinations of L1/L2 management over others.

The UEe logic may also be configured to implement logical hierarchies of the various methods, such as use of one as a default, and the other as a "fallback" technique depending on e.g., operational conditions, efficacy or lack of efficacy of one approach at mitigating overflow/packet loss relative to another, and so forth.

User Apparatus—

Figure 23:
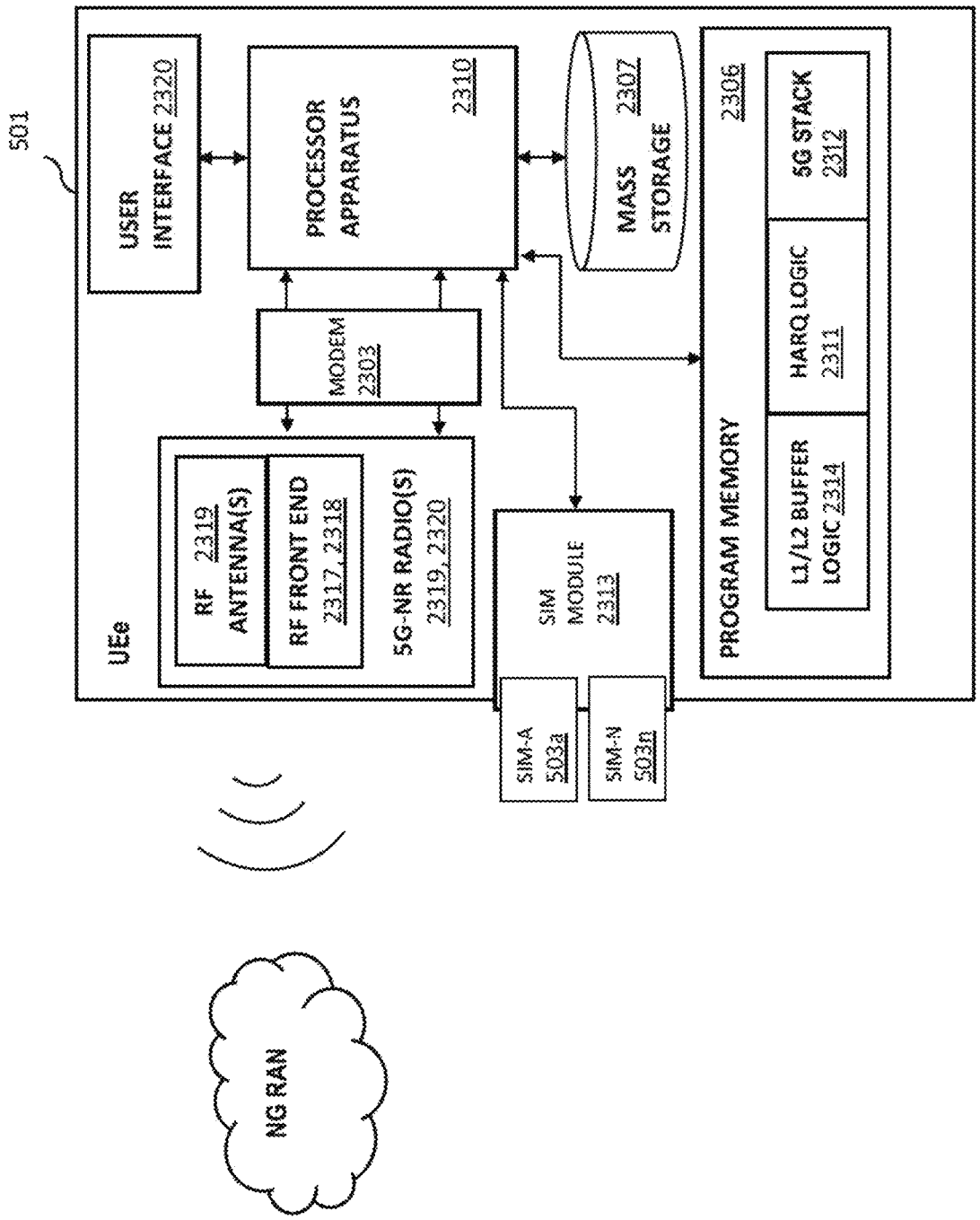
FIG. 23 is a functional block diagram illustrating one embodiment of a user device (e.g., enhanced UE or user equipment such as a mobile device) configured according to the disclosure.

FIG. 23 illustrates a block diagram of an exemplary embodiment of a user apparatus (e.g., 3GPP-based UEe 501), useful for operation in accordance with various aspects of the present disclosure.

In one exemplary embodiment as shown, the UEe 501 includes, inter alia, a processor apparatus or subsystem 2310 (including a baseband processor or modem), a program memory module 2306, HARQ logic 2311, L1/L2 buffer logic 2314 (here implemented as software or firmware operative to execute on the processor 2310), and wireless radio interfaces 2319, 2320 for communications with the relevant RANs (e.g., 5G-NR RAN A, B). The RF interfaces 2317, 2318 are each configured to comply with the relevant PHY standards which it supports.

The antenna(s) 2319 of the UEe radios may include multiple spatially diverse individual elements in e.g., a MIMO- or MISO-type configuration (including so-called Massive MIMO or mMIMO), such that spatial diversity of the received signals can be utilized. Moreover, a phased array or similar arrangement can be used for spatial resolution within the environment, such as based on time delays associated with signals received by respective elements.

In one embodiment, the processor apparatus 2310 may include one or more of a digital signal processor, microprocessor, field-programmable gate array, GPU, or plurality of processing components mounted on one or more substrates. The processor apparatus may also comprise an internal cache memory, and modem 2303. As indicated, the exemplary configuration of the UEe includes an HARQ logic 2311, and 5G stack 2312 on the program memory which is in communication with the processing subsystem, where the former may include memory which may comprise, e.g., SRAM, flash and/or SDRAM components. The memory module 2306 may implement one or more of direct memory access (DMA) type hardware, so as to facilitate data accesses as is well known in the art. The memory module of the exemplary embodiment contains one or more computer-executable instructions that are executable by the processor apparatus 2310. A mass storage device 2307 (e.g., HDD or SSD, or NAND/NOR flash or the like, such as via eMCC) is also provided as shown.

Other embodiments may implement the HARQ functionality within dedicated hardware, logic, and/or specialized co-processors (not shown). As noted, the UEe 501 may include HARQ logic which is configured to process HARQ process management and prioritization, and provide L1 buffer management to avoid buffer overflow. In one embodiment, the HARQ module 2311 manages DR transmission within the UCI, and processing gNBe HARQ scheduling responses. The HARQ logic is in communication with the modem 2303 (via its execution on the processor) regarding the HARQ process. The modem 2303 processes the baseband control and data signals for transmission and reception in the RF frond end module 2319.

Moreover, the UEe 501 may include L2 buffer logic within the L1/L2 module 2314 which is configured to perform L2 buffer size computation depending on the user traffic, and to support the desired data rate. In one embodiment, the L2 buffer size is defined as the sum of bytes that the UEe is capable of storing in the RLC transmission/reception/reordering, and PDP reordering window. In another embodiment the L2 buffer logic calculates the scaling factors for each network (PLMN 511). The modem 2303 processes the baseband control and data signals for transmission and reception in the RF frond end module 2317.

In some embodiments, the UEe also utilizes memory 2306 or other storage 2307 configured to temporarily hold a number of data relating to the various network associations (e.g., cells or gNBe's which the UEe has associated with under the multi-PLMN procedures described herein), and for the various supported services/applications such as voice, etc. In other embodiments, application program interfaces (APIs) such as those included in an MSO-provided application or those natively available on the use may also reside in the internal cache or other memory 2306. Such APIs may include for example common network protocols or programming languages configured to enable communication with the UEe 501 and other network entities.

The UEe 501 further includes SIM apparatus 2313 in data communication with the processor 2310. In one embodiment, the SIM apparatus 2313 includes one or more individual ICs or chips that are configured to enable connection to at least one mobile network, as well as comprising logic to support buffer management within the host UEe In one variant, the individual SIM apparatus 503 are removable (e.g., SIM cards) and include at least portions of logic or data to communicate with the host device and/or authorized network that the UEe is buffer management-enabled. In one implementation, the SIM apparatus is a physical SIM or mini-SIM or micro-SIM card or form factor.

In another variant, the SIM apparatus is embodied as an e-SIM or electronic SIM, such as may be stored in a SE (secure element) or other physical device of the UE (e.g., which may be integrated within the processor 2310 or a memory device of the UEe, a standalone SE, or otherwise).

Wireless Access Node Apparatus—

Figure 24:
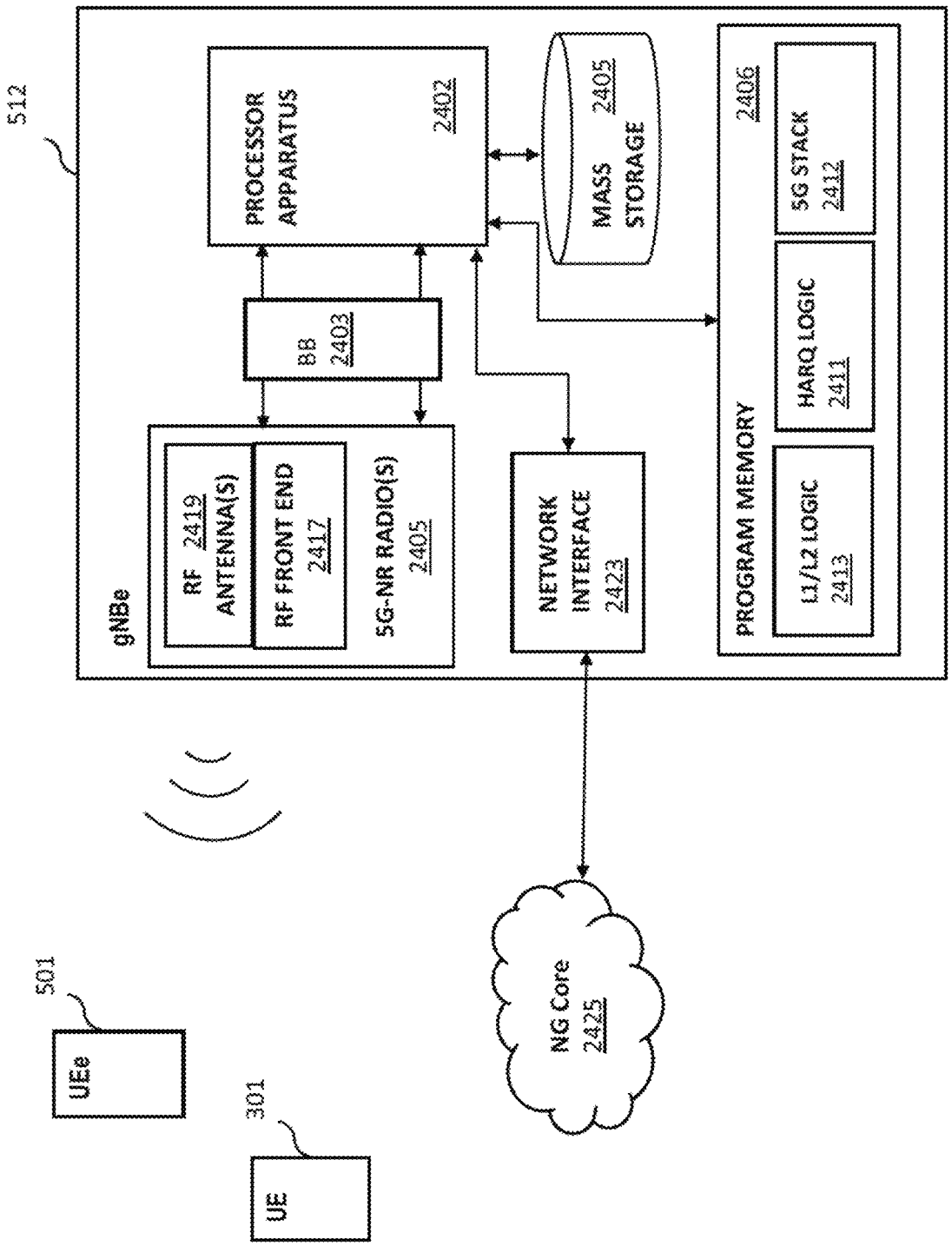
FIG. 24 is functional block diagram illustrating one embodiment of an enhanced wireless access node (e.g., 5G NR compliant enhanced gNB) according to the disclosure.

FIG. 24 illustrates a block diagram of an exemplary embodiment of a wireless access node (e.g., 3GPP 5G enabled gNBe 512) apparatus, useful for operation in accordance with the present disclosure.

In one exemplary embodiment as shown, the gNBe includes, inter alia, a processor apparatus or subsystem 2402, a program memory module 2406, a local mass storage device with database 2405, and wireless radios 2405 for communications with the relevant UEe and UE devices. The gNBe also includes a network interface 2423 for communication with other entities (e.g., 4G/4.5G E-UTRAN, and 5GC 2425, and 5G-NR RAN infrastructure, of which the gNBe 512 is part).

The 5G RF interface 2405 may be configured to comply with the relevant PHY according to the relevant 3GPP NR standards which it supports (e.g., 5G NR). The antenna(s) 2419 of the radios of the gNBe may include multiple spatially diverse individual elements in e.g., a MIMO- or MISO-type configuration (including so-called Massive MIMO or mMIMO), such that spatial diversity of the received signals can be utilized. Moreover, a phased array or similar arrangement can be used for spatial resolution within the environment, such as based on time delays associated with signals received by respective elements.

In one embodiment, the processor apparatus 2402 may include one or more of a digital signal processor, microprocessor, baseband (BB) processor, field-programmable gate array, GPU, or plurality of processing components mounted on one or more substrates. The processor apparatus may also comprise an internal cache memory, and modem(s) 2403. In addition, the gNBe may include a HARQ logic module 2411 and 5G stack 2412 on the program memory which is in communication with the processing subsystem. In one example, the HARQ module maybe implemented in gNBe as software or firmware stored on a storage device and executed on the processor 2402. The HARQ module is configured to process HARQ process and scheduling for UEe's. In one embodiment, the HARQ module manages receiving DR data within the UCI, and determines scheduling of HARQ processes instantly or at pre-defined future times (depending on configuration). The HARQ logic is in communication with the modem 2403 (via its execution on the processor) regarding the HARQ scheduling and DR data. The modem 2403 processes the baseband control and data signals for transmission and reception in the RF frond end module 2419.

The processing subsystem 2402 is in communication with a program memory module or subsystem 2406, where the latter may include memory which may comprise, e.g., SRAM, flash and/or SDRAM (e.g., GDDR5 or GDDR6) components. The memory module 2406 may implement one or more of direct memory access (DMA) type hardware, so as to facilitate data accesses as is well known in the art. The memory module of the exemplary embodiment contains one or more computer-executable instructions that are executable by the processor apparatus 2402. A mass storage device (e.g., HDD or SSD, or NAND/NOR flash or the like) is also provided as shown.

The gNBe may also include an L1/L2 buffer management module 2413 with logic configured to support various aspects of UEe and network operation, both in coordinated and un-coordinated PLMN network scenarios. For instance, in one variant, the logic 2413 is configured to receive IE data from the various UEe 501 within the RAN, and distribute the data to other PLMN entities with which the UEe might communicate via its USIMs. The L1/L2 logic may also be configured to provide network feedback to the UEe (see FIG. 12), or perform other functions as described herein (including receipt of RRC connection and S-UL/SCG reduction requests from UEe pursuant to the method of FIG. 22.

The processor apparatus 2402 is configured to execute at least one computer program stored in memory (e.g., the logic of the HARQ and L1/L2 modules according to the methods described herein, in the form of software or firmware that implements the various functions). Other embodiments may implement such functionality within dedicated hardware, logic, and/or specialized co-processors (not shown).

In some embodiments, the logic 2311, 2312, 2313 also utilizes memory 2306 or other storage configured to temporarily and/or locally hold a number of data relating to the various associations for the various UEe 501 which it services under the 5G NR or other standard(s). In other embodiments, application program interfaces (APIs) may also reside in the internal cache or other memory 2306. Such APIs may include common network protocols or programming languages configured to enable communication between with other network entities (e.g., via API "calls" to or from the NG Core or other PLMN entities).

Service Provider Networks

Figure 25:
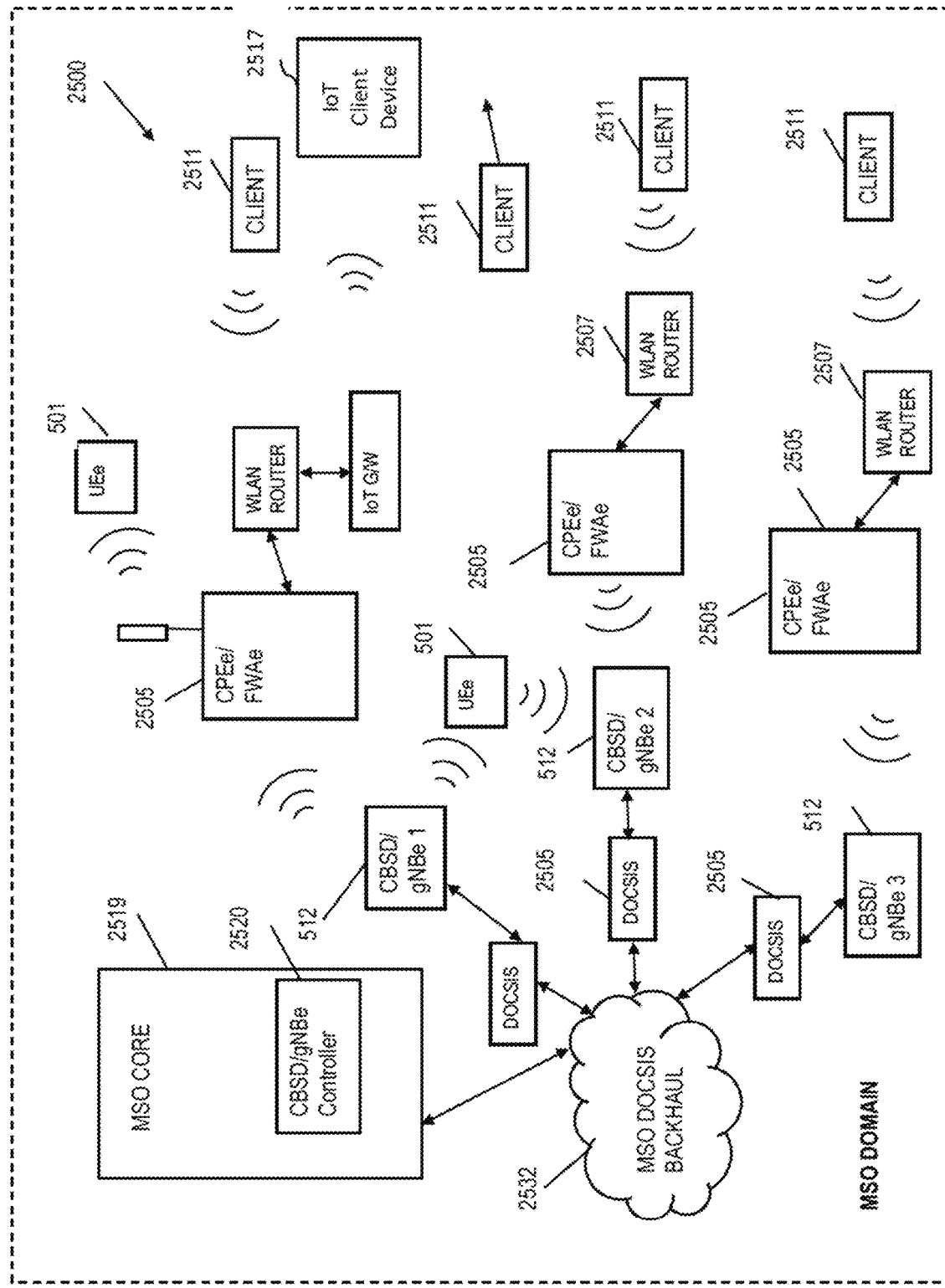
FIG. 25 is a functional block diagram of a first exemplary MSO network architecture useful in conjunction with various principles described herein.

FIG. 25 illustrates a typical service provider network configuration useful with the features of the apparatus and methods described herein. It will be appreciated that while described with respect to such network configuration, the methods and apparatus described herein may readily be used with other network types and topologies, whether wired or wireless, managed or unmanaged.

The exemplary service provider network 2900 is used in the embodiment of FIG. 25 to provide backbone and Internet access from the service provider's wireless access nodes (e.g., Node B or CBRS CBSD devices such as the buffer management/DC capable gNBe's previously described herein, Wi-Fi APs, and FWA devices operated or maintained by the MSO), and one or more stand-alone or embedded cable modems (CMs) 2533 in data communication therewith. It will be appreciated that the gNBe and UEe devices described herein may operate on licensed, unlicensed, or quasi-licensed/shared access spectrum while utilizing the underlying 3GPP 5G NR/NR-U based protocols described herein.

The individual gNBe's 512 are backhauled by the CMs 2505 to the MSO core via e.g., CMTS or CCAP MHAv2/RPD or other such architecture, and the MSO core 2532 includes at least some of the EPC/5GC core functions previously described, as well as a gNBe controller process 2520 as shown. The controller process is in one embodiment a network-based server which communicates with the various gNBe within the MSO infrastructure so as to effect various functions including in some cases the logic of FIGS. 9-22 as previously described. The controller 2520 can communicate with the gNBe's via the primary backhaul. The gNBe's 512 may also be configured to fail to their internal logic when communication with the network controller process is lost, in effect self-moderating for decisions of buffer management modes and operation.

While not shown, it will also be appreciated that the logic of the UEe 501 relating to HARQ and buffer management operation may also be communicative with and controlled at least in part by the network controller 2520 in some embodiments, such as via established connections between the UEe and one or more gNBe's, or alternatively via another backhaul such as WLAN link.

Client devices 2511 such as tablets, smartphones, SmartTVs, etc. at each premises are served by respective WLAN routers 2507, IoT gateways 2517, and CBRS CPE/FWA 2505, the latter which are backhauled to the MSO core or backbone via their respective gNBe's, and which themselves may be enhanced with buffer management capability and DC/MC capability to act in effect as fixed UEe 501.

Notably, in the embodiment of FIG. 25, all of the necessary components for support of the wireless service provision and backhaul functionality are owned, maintained and/or operated by the common entity (e.g., cable MSO). The approach of FIG. 25 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNB DUe/CUe Option "splits" within the infrastructure, selection or configuration of subsets or groups of gNBe (or their individual DUe) which can participate in coordinated UEe buffer management, RRC connection processes, etc.

Figure 26:
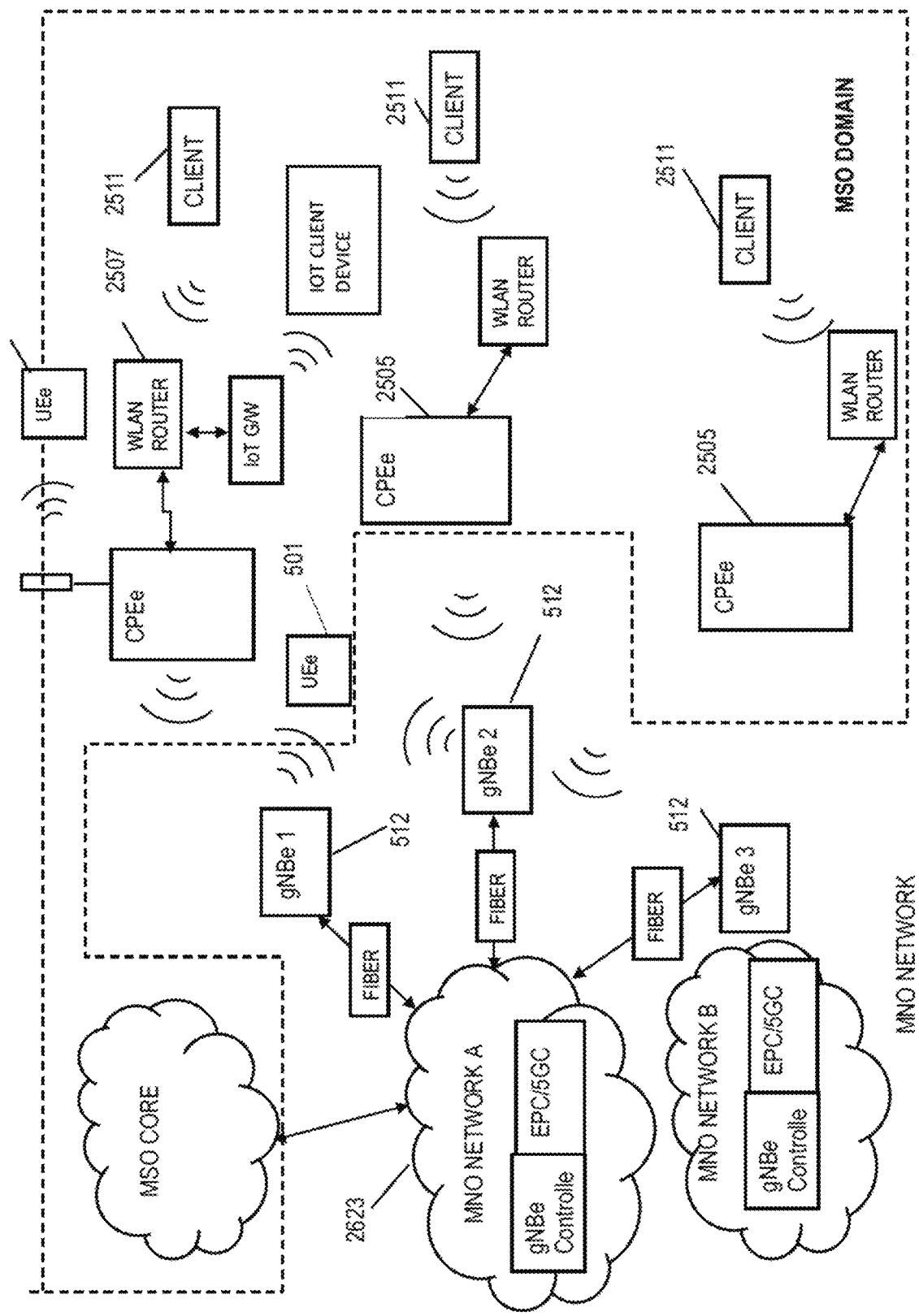
FIG. 26 is a functional block diagram of an exemplary MNO network architecture useful in conjunction with various principles described herein, wherein respective portions of the infrastructure are managed or operated by the MSO and one or more MNOs.

FIG. 26 illustrates another embodiment, highlighting one possible relationship between an MSO architecture and an MNO architecture. As shown, the MSO service domain extends only to the CPEe/FWAe and served premises and the MSO core functions, while other functions such as 3GPP EPC/E-UTRAN or 5GC and NG-RAN functionality, as well as gNBe and controller functions if utilized, are provided by one or more MNO networks 2632 operated by MNOs (may belong to the same or different operators), including in some embodiments with which the MSO has a service agreement. In this approach, the controller server 2520 is maintained and operated by the MNO (since the MNO maintains cognizance over the gNBe's 512), although this is not a requirement, and the present disclosure contemplates embodiments where the controller function is maintained by the MSO or even a third party. The approach of FIG. 26 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) gNBe's or other transceivers.

Hence, depending on what data is useful to the MSO or its customers, various portions of the foregoing can be associated and stored to particular gNBe "clients" or their components being backhauled by the MSO network, whether owned by the MSO, MNO, or another entity. These data can also be utilized by e.g., the controller or another network process in scheduling and controlling HARQ and buffer management processes for MUSIM UEe's within the infrastructure such as based on operational loading of a given gNBe or the network as a whole, UEe location relative to the gNBe's, subscriber account or subscription level or privileges, presence of other suitable backhauls for the UEe such as WLAN, 5G NR network slicing considerations, and/or yet other factors which will be recognized by those of ordinary skill in the wireless infrastructure arts given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computer readable apparatus comprising a non-transitory storage medium, the non-transitory storage medium comprising at least one computer program having a plurality of instructions, the plurality of instructions configured to, when executed on a digital processing apparatus, cause a computerized client device to:
   establish data communications with a first radio area network (RAN) and a second RAN such that a portion of the data communication with the first RAN temporally overlaps with at least a portion of the data communication with the second RAN; and
   mitigate overflow of a Layer 1 (L1) buffer for the computerized client device having the established data communications with the first RAN and the second RAN, the mitigation of the overflow of the L1 buffer comprising:
      division of the first and second RANs into two or more categories;
      configuration of the computerized client device connected to one of the first or second RANs of a first one of the two or more categories to delay first HARQ processing according to a temporal or non-temporal parameter;
      allocation of the L1 buffer to second HARQ processing for one of the first or second RANs of a second one of the two or more categories;
      perform the second HARQ processing via the L1 buffer for the one of the first or second RANs of the second one of the two or more categories; and
      perform the first HARQ processing for the one of the first or second RANs of the first one of the two or more categories after the delay.

2. The computer readable apparatus of claim 1, wherein the first one of the two or more categories comprises a category of one or more lower priority networks, and the second one of the two or more categories comprises a category of one or more higher priority networks.

3. The computer readable apparatus of claim 1, wherein:
   the first RAN utilizes a 3rd Generation Partnership Project (3GPP) Long Term Evolution (LTE)-based technology; and
   the second RAN utilizes a 3GPP New Radio (5G-NR)-based technology.

4. A computerized method of operating a wireless user device, the computerized method comprising:
   establishing data communications with a first radio area network (RAN) and a second RAN such that a portion of the data communication with the first RAN temporally overlaps with at least a portion of the data communication with the second RAN; and
   estimating a Layer 2 (L2) buffer size in a non-dual connectivity (NDC) mode of operation, the estimating of the L2 buffer size with respect to the NDC mode of operation comprising:
      computing a first value; and
      multiplying the first value by a number relating to a Subscriber Identification Card (SIM) configuration of the wireless user device to compute the L2 buffer size.

5. The computerized method of claim 4, wherein the establishing data communications with the first RAN and the second RAN comprises establishing data communication with a RAN utilizing a 3rd Generation Partnership Project (3GPP) Long Term Evolution (LTE)-based technology, and a second RAN utilizing a 3GPP New Radio (5G-NR)-based technology.

6. A computerized method of operating a wireless user device, the computerized method comprising:
   establishing data communications with a first radio area network (RAN) and a second RAN such that a portion of the data communication with the first RAN temporally overlaps with at least a portion of the data communication with the second RAN; and
   estimating a Layer 2 (L2) buffer size in a dual connectivity (DC) mode of operation, the estimating of the L2 buffer size with respect to the DC mode of operation comprising:
      computing a second value;
      multiplying the second value by a number relating to a SIM (subscriber identity module) configuration of the wireless user device;
      updating the second value by a product of the second value and the number;
      computing a third value;
      multiplying the third value by the number;
      updating the third value by a product of the third value and the number; and
      computing the L2 buffer size as a maximum of the second value and the third value.

7. The computerized method of claim 6, wherein the establishing data communications with the first RAN and the second RAN comprises establishing data communication with a RAN utilizing a 3rd Generation Partnership Project (3GPP) Long Term Evolution (LTE)-based technology, and another RAN utilizing a 3GPP New Radio (5G-NR)-based technology.

8. A computerized mobile device configured for use within multiple mobile network environments, the computerized mobile device comprising:
   digital processor apparatus;
   first wireless interface apparatus in data communication with the digital processor apparatus and configured for wireless communication with a first radio area network (RAN);
   second wireless interface apparatus in data communication with the digital processor apparatus and configured for wireless communication with a second RAN; and
   Layer 2 (L2) buffer logic in data communication with the digital processor apparatus, the L2 buffer logic comprises scaling weight computation logic, the scaling weight computation logic configured to:
      evaluate a first expected scheduling capacity for the first RAN and a second expected scheduling capacity for the second RAN;

based on the evaluation, compute one or more first buffer scaling factors relating to the first RAN and one or more second buffer scaling factors relating to the second RAN;

based on coordination between the first and second RANs, report each of the first and second buffer scaling factors to only one of the first RAN or the second RAN; and allocate (i) a first L2 buffer portion to the first RAN proportional to the one or more first buffer scaling factors, and (ii) a second L2 buffer portion to the second RAN proportional to the one or more second buffer scaling factors.

9. The computerized mobile device of claim 8, further comprising storage apparatus in data communication with the digital processor apparatus and comprising a storage medium, the storage medium comprising at least one computer program, the at least one computer program configured to, when executed on the digital processor apparatus, cause the computerized mobile device to:

contemporaneously establish (i) data communication with a first network management entity associated with the first RAN, the first network management entity associated with a first network operator and a first mobile network, and (ii) data communication with a second network management entity associated with the second RAN, the second network management entity associated with a second network operator and a second mobile network, such that at least a portion of the data communication between the computerized mobile device and the first network management entity temporally overlaps with at least a portion of the data communication between the computerized mobile device and the second network management entity.

10. The computerized mobile device of claim 9, wherein:
the first mobile network utilizes a 3rd Generation Partnership Project (3GPP) Long Term Evolution (LTE)-based technology; and
the second mobile network utilizes a 3GPP New Radio (5G-NR)-based technology.

11. The computerized mobile device of claim 9, wherein the contemporaneous establishment of the data communication with the first network management entity associated with the first RAN and the data communication with the second network management entity associated with the second RAN comprises maintenance of at least (i) a first RRC (radio resource control) connection for the data communication with the first network management entity and (ii) a second, separate RRC (radio resource control) connection for the data communication with the second network management entity.

12. The computerized mobile device of claim 11, wherein the computerized mobile device further comprises Layer 1 (L1) buffer management logic in data communication with the digital processor apparatus, the L1 buffer management logic configured to enable decoding of data received from one or both of the first and second network management entities without buffer overflow or packet loss.

13. The computerized mobile device of claim 12, wherein the L2 buffer logic is configured to:
store data received from a network node;
parse the data received from the network node to L1 frames; and
transfer the parsed data to an L1 buffer associated with the L1 buffer management logic.

14. The computerized mobile device of claim 12, wherein the L1 buffer management logic comprises logic for performance of at least one of (i) negotiating or (ii) signaling, for HARQ (hybrid automatic retransmission request) processing.

15. The computerized mobile device of claim 12, wherein the L1 buffer management logic comprises multiple virtual buffers, each of multiple virtual buffers associated to one of the first or second RANs, and configured to receive data from the associated one of the first or second network management entities.

16. The computerized mobile device of claim 12, wherein the L1 buffer management logic comprises delay request (DR) logic, the DR logic configured to enable the computerized mobile device to request one of the first or second network management entities to delay transmission of HARQ (hybrid automatic retransmission request) process data to the computerized mobile device.

17. The computerized mobile device of claim 8, wherein (i) the one or more first buffer scaling factors correlate to a first L2 buffer size that the computerized mobile device intends to allocate to the first RAN, and (ii) the one or more second buffer scaling factors correlate to a second L2 buffer size that the computerized mobile device intends to allocate to the second RAN.

18. The computerized mobile device of claim 8, wherein:
initial recommended first and second buffer scaling factors are received at the computerized mobile device from at least one of the first and second RANs, the initial recommended first and second buffer scaling factors each comprising a network-based estimate or recommendation of an initial scaling factor for the computerized mobile device to use; and
the computation of the one or more first buffer scaling factors relating to the first RAN and the one or more second buffer scaling factors relating to the second RAN is further based on the initial recommended first and second buffer scaling factors.

19. Computer readable apparatus comprising a non-transitory storage medium, the non-transitory storage medium comprising at least one computer program having a plurality of instructions, the plurality of instructions configured to, when executed on a digital processing apparatus, cause a computerized client device to:

establish data communications with a first radio area network (RAN) and a second RAN such that a portion of the data communication with the first RAN temporally overlaps with at least a portion of the data communication with the second RAN;

compute respective scaling weights for the first and second RANs;

allocate a first portion of an L1 buffer to the first RAN and a second portion of the L1 buffer to the second RAN to attempt to avoid overflow, wherein the respective allocations of the first and second portions of the L1 buffer to the first RAN and the second RAN are proportional to the respective scaling weights assigned to the first and second RANs;

monitor respective throughputs from the first and second RANs; and adjust the scaling weights iteratively for optimization thereof to achieve a desired objective.

20. The computer readable apparatus of claim 19, wherein:
wherein the allocation of the first portion of the L1 buffer to the first RAN and the second portion of the L1 buffer to the second RAN further comprises a determination of a scheduling capacity by each of the first and second RANs and buffer overflow; and the assignment of the scaling weights to the first and second RANs, respectively, comprises:
  computation of the scaling weights indicating an L1 buffer portion relative to a maximum L1 buffer size that the computerized client device prospectively will allocate, based at least on the determined scheduling capacity, to each of the first and second RANs; and
  division of the L1 buffer into separate virtual buffers, each of the separate virtual buffers associated with one of the first or second RANs, with a size of each of the separate virtual buffers being proportionate to a respective computed scaling weight of the scaling weights.

21. The computer readable apparatus of claim 19, wherein the allocation of the first portion of the L1 buffer to the first RAN and the second portion of the L1 buffer to the second RAN further comprises optimization of the scaling weights iteratively to achieve at least one objective, the at least one objective comprising at least one of (i) no lost packets or overflow, or (ii) enhanced data throughput and efficiency.

22. The computer readable apparatus of claim 19, wherein:
  the first RAN utilizes a 3rd Generation Partnership Project (3GPP) Long Term Evolution (LTE)-based technology; and
  the second RAN utilizes a 3GPP New Radio (5G-NR)-based technology.

23. The computer readable apparatus of claim 19, wherein adjustment of the scaling weights comprises a re-calculation of the scaling weights based on (i) an expected scheduling load associated with each of the first and second RANs, (ii) one or more of prioritization, latency, or QOS requirements of traffic being carried by each of the first and second RANs, and (iii) expected vs. actual data throughput realized from each of the first and second RANs.

* * * * *